US008842182B2

(12) United States Patent
Mimeault et al.

(10) Patent No.: US 8,842,182 B2
(45) Date of Patent: Sep. 23, 2014

(54) ACTIVE 3D MONITORING SYSTEM FOR TRAFFIC DETECTION

(75) Inventors: Yvan Mimeault, Québec (CA); Louis Perreault, Québec (CA); Martin Dubois, Charny (CA)

(73) Assignee: LeddarTech inc., Québec, QC (CA)

( * ) Notice: Subject to any disclaimer, the term of this patent is extended or adjusted under 35 U.S.C. 154(b) by 275 days.

(21) Appl. No.: 13/512,407

(22) PCT Filed: Dec. 22, 2010

(86) PCT No.: PCT/IB2010/056037
§ 371 (c)(1),
(2), (4) Date: May 29, 2012

(87) PCT Pub. No.: WO2011/077400
PCT Pub. Date: Jun. 30, 2011

(65) Prior Publication Data
US 2012/0307065 A1    Dec. 6, 2012

Related U.S. Application Data

(60) Provisional application No. 61/289,211, filed on Dec. 22, 2009.

(51) Int. Cl.
*H04N 7/18*   (2006.01)
*G01S 17/02*  (2006.01)
*G01S 17/89*  (2006.01)
*G08G 1/04*   (2006.01)

(52) U.S. Cl.
CPC ............... *G08G 1/04* (2013.01); *G01S 17/026* (2013.01); *G01S 17/89* (2013.01); *G01S 17/023* (2013.01)
USPC ......................................................... 348/149

(58) Field of Classification Search
CPC ........................................................ G08G 1/04
USPC ......................................................... 348/149
See application file for complete search history.

(56) References Cited

U.S. PATENT DOCUMENTS 3,680,085 A    7/1972   Del Signore
4,533,242 A    8/1985   McLauchlan et al.
(Continued)

FOREIGN PATENT DOCUMENTS

CA    2710212    7/2009
CN    2857132    1/2007
(Continued)

OTHER PUBLICATIONS

United States Department of Transportation, Federal Highway Administration, Sensor Technology—Chapter 2, Traffic Detector Handbook: Third Edition—vol. 1, FHWA-HRT-06-108, available at http://www.tfhrc.gov/its/pubs/06108/02a.htm on Sep. 16, 2009.

(Continued)

*Primary Examiner* — Hung Dang
*Assistant Examiner* — Sunghyoun Park
(74) *Attorney, Agent, or Firm* — Fasken Martineau

(57) ABSTRACT

The traffic detection system includes an optical unit having an emitter module emitting pulses; a receiver module having a field of view including a plurality of adjacent detection channels receiving pulses reflected by an object and acquiring and converting the received pulses into a corresponding plurality of a digital signal waveforms; an image sensing module providing an image. The method comprises providing a status overlay image including the image and a visual indication on the image of an outline of the plurality of adjacent detection channels; positioning the field of view to cover the detection zone using the status overlay image; obtaining the plurality of digital signal waveforms; detecting a signal echo caused by an object in one of the digital signal waveforms at a position within the field of view; determining a location for the object using the position; storing the location for the object.

22 Claims, 20 Drawing Sheets

(56) References Cited

U.S. PATENT DOCUMENTS

| | | |
|---|---|---|
| 4,717,862 A | 1/1988 | Anderson |
| 4,808,997 A | 2/1989 | Barkley et al. |
| 4,891,624 A | 1/1990 | Ishikawa et al. |
| 4,928,232 A | 5/1990 | Gentile |
| 5,102,218 A | 4/1992 | Min et al. |
| 5,134,393 A | 7/1992 | Henson |
| 5,179,286 A | 1/1993 | Akasu |
| 5,270,780 A | 12/1993 | Moran et al. |
| 5,317,311 A | 5/1994 | Martell et al. |
| 5,357,331 A | 10/1994 | Flockencier |
| 5,381,155 A | 1/1995 | Gerber |
| 5,389,921 A | 2/1995 | Whitton |
| 5,621,518 A | 4/1997 | Beller |
| 5,633,629 A | 5/1997 | Hochstein |
| 5,633,801 A | 5/1997 | Bottman |
| 5,714,754 A | 2/1998 | Nicholas |
| 5,760,686 A | 6/1998 | Toman |
| 5,760,887 A | 6/1998 | Fink et al. |
| 5,764,163 A | 6/1998 | Weldman et al. |
| 5,777,564 A | 7/1998 | Jones |
| 5,805,468 A | 9/1998 | Blöhbaum |
| 5,812,249 A | 9/1998 | Johnson et al. |
| 5,828,320 A | 10/1998 | Buck |
| 5,838,116 A | 11/1998 | Katyl et al. |
| 5,889,477 A | 3/1999 | Fasterath |
| 5,896,190 A | 4/1999 | Wangler et al. |
| 5,942,753 A | 8/1999 | Dell |
| 5,953,110 A | 9/1999 | Burns |
| 5,963,127 A | 10/1999 | Lang et al. |
| 5,995,900 A | 11/1999 | Hsiao et al. |
| 6,044,336 A | 3/2000 | Marmarelis et al. |
| 6,094,159 A | 7/2000 | Osterfeld et al. |
| 6,100,539 A | 8/2000 | Blümcke et al. |
| 6,104,314 A | 8/2000 | Jiang |
| 6,107,942 A | 8/2000 | Yoo et al. |
| 6,115,113 A | 9/2000 | Flockencier |
| 6,142,702 A | 11/2000 | Simmons |
| 6,147,624 A | 11/2000 | Clapper |
| 6,166,645 A | 12/2000 | Blaney |
| 6,259,515 B1 | 7/2001 | Benz et al. |
| 6,259,862 B1 | 7/2001 | Marino et al. |
| 6,266,609 B1 | 7/2001 | Fastenrath |
| 6,285,297 B1 | 9/2001 | Ball |
| 6,340,935 B1 | 1/2002 | Hall |
| 6,363,326 B1 | 3/2002 | Scully |
| 6,377,167 B1 | 4/2002 | Juds et al. |
| 6,388,565 B1 | 5/2002 | Bernhard et al. |
| 6,404,506 B1 | 6/2002 | Cheng et al. |
| 6,411,221 B2 | 6/2002 | Horber |
| 6,417,783 B1 | 7/2002 | Gabler et al. |
| 6,426,708 B1 | 7/2002 | Trajkovic et al. |
| 6,502,011 B2 | 12/2002 | Haag |
| 6,502,053 B1 | 12/2002 | Hardin et al. |
| 6,516,286 B1 | 2/2003 | Aebischer et al. |
| 6,548,967 B1 | 4/2003 | Dowling et al. |
| 6,556,916 B2 | 4/2003 | Waite et al. |
| 6,559,776 B2 | 5/2003 | Katz |
| 6,642,854 B2 | 11/2003 | McMaster |
| 6,650,250 B2 | 11/2003 | Muraki |
| 6,665,621 B2 | 12/2003 | Drinkard et al. |
| 6,674,394 B1 | 1/2004 | Zoratti |
| 6,753,766 B2 | 6/2004 | Patchell |
| 6,753,950 B2 | 6/2004 | Morcom |
| 6,765,495 B1 | 7/2004 | Dunning et al. |
| 6,771,185 B1 | 8/2004 | Yoo et al. |
| 6,794,831 B2 | 9/2004 | Leeb et al. |
| 6,825,778 B2 | 11/2004 | Bergan et al. |
| 6,831,576 B2 | 12/2004 | Geiger et al. |
| 6,836,317 B1 | 12/2004 | Perger |
| 6,842,231 B2 | 1/2005 | Nourrcier et al. |
| 6,850,156 B2 | 2/2005 | Bloomfield et al. |
| 6,885,311 B2 | 4/2005 | Howard |
| 6,885,312 B1 | 4/2005 | Kirkpatrick |
| 6,917,307 B2 | 7/2005 | Li |
| 6,927,700 B1 | 8/2005 | Quinn |
| 6,946,974 B1 | 9/2005 | Racunas Jr. |
| 7,026,954 B2 | 4/2006 | Slemmer et al. |
| 7,049,945 B2 | 5/2006 | Breed et al. |
| 7,081,832 B2 | 7/2006 | Nelson et al. |
| 7,106,214 B2 | 9/2006 | Jesadanont et al. |
| 7,116,246 B2 | 10/2006 | Winter et al. |
| 7,119,674 B2 | 10/2006 | Sefton |
| 7,119,715 B2 | 10/2006 | Orita |
| 7,123,166 B1 | 10/2006 | Haynes et al. |
| 7,135,991 B2 | 11/2006 | Slemmer et al. |
| 7,148,813 B2 | 12/2006 | Bauer |
| 7,209,221 B2 | 4/2007 | Breed et al. |
| 7,221,271 B2 | 5/2007 | Reime |
| 7,221,288 B2 | 5/2007 | Fitzgibbon et al. |
| 7,236,102 B2 | 6/2007 | Shimotani |
| 7,250,605 B2 | 7/2007 | Zhevelev et al. |
| 7,253,747 B2 | 8/2007 | Noguchi |
| 7,317,384 B2 | 1/2008 | Lefranc |
| 7,319,777 B2 | 1/2008 | Morcom |
| 7,321,317 B2 | 1/2008 | Nath et al. |
| 7,350,945 B2 | 4/2008 | Albou et al. |
| 7,352,972 B2 | 4/2008 | Franklin |
| 7,359,782 B2 | 4/2008 | Breed et al. |
| 7,378,947 B2 | 5/2008 | Daura Luna et al. |
| 7,405,676 B2 | 7/2008 | Janssen |
| 7,417,718 B2 | 8/2008 | Wada et al. |
| 7,426,450 B2 | 9/2008 | Arnold et al. |
| 7,486,204 B2 | 2/2009 | Quintos |
| 7,492,281 B2 | 2/2009 | Lynam et al. |
| 7,504,932 B2 | 3/2009 | Bartels |
| 7,527,207 B2 | 5/2009 | Acosta et al. |
| 7,554,652 B1 | 6/2009 | Babin et al. |
| 7,573,400 B2 | 8/2009 | Arnold et al. |
| 7,616,293 B2 | 11/2009 | Sirota et al. |
| 7,633,433 B2 | 12/2009 | Behrens et al. |
| 7,635,854 B1 | 12/2009 | Babin |
| 7,640,122 B2 | 12/2009 | Levesque et al. |
| 7,652,245 B2 | 1/2010 | Crickmore et al. |
| 7,688,222 B2 | 3/2010 | Peddie et al. |
| 7,760,111 B2 | 7/2010 | Lynam et al. |
| 7,764,193 B2 | 7/2010 | Chen |
| 7,796,081 B2 | 9/2010 | Breed |
| 7,808,401 B1 | 10/2010 | Schwartz et al. |
| 7,852,462 B2 | 12/2010 | Breed et al. |
| 7,855,376 B2 | 12/2010 | Cantin et al. |
| 7,859,432 B2 | 12/2010 | Kim et al. |
| 7,872,572 B2 | 1/2011 | Harrington et al. |
| 7,889,097 B1 | 2/2011 | Arnold et al. |
| 7,889,098 B1 | 2/2011 | Arnold et al. |
| 7,895,007 B2 | 2/2011 | Levesque et al. |
| 7,898,433 B2 | 3/2011 | Roberts |
| 7,917,320 B2 | 3/2011 | Levesque et al. |
| 7,933,690 B2 | 4/2011 | Kushida et al. |
| 7,952,491 B2 | 5/2011 | Schwartz et al. |
| 7,957,900 B2 | 6/2011 | Chowdhary et al. |
| 8,242,476 B2 | 8/2012 | Mimeault et al. |
| 2002/0005778 A1 | 1/2002 | Breed et al. |
| 2002/0033884 A1 | 3/2002 | Schurr |
| 2002/0117340 A1 | 8/2002 | Stettner |
| 2003/0154017 A1 | 8/2003 | Ellis |
| 2003/0189500 A1 | 10/2003 | Lim |
| 2004/0035620 A1 | 2/2004 | McKeeferey |
| 2004/0051859 A1 | 3/2004 | Flockencier |
| 2004/0083035 A1 | 4/2004 | Ellis |
| 2004/0118624 A1 | 6/2004 | Beuhler et al. |
| 2004/0135992 A1 | 7/2004 | Munro |
| 2005/0046597 A1 | 3/2005 | Hutchison et al. |
| 2005/0117364 A1 | 6/2005 | Rennick et al. |
| 2005/0187701 A1 | 8/2005 | Baney |
| 2005/0231384 A1 | 10/2005 | Shimotani |
| 2005/0232469 A1 | 10/2005 | Schofield et al. |
| 2005/0269481 A1 | 12/2005 | David et al. |
| 2005/0270175 A1 | 12/2005 | Peddie et al. |
| 2005/0285738 A1 | 12/2005 | Seas et al. |
| 2006/0033641 A1 | 2/2006 | Jaupitre |
| 2006/0145824 A1 | 7/2006 | Frenzel et al. |
| 2006/0147089 A1 | 7/2006 | Han et al. |
| 2006/0149472 A1 | 7/2006 | Han et al. |
| 2006/0180670 A1 | 8/2006 | Acosta et al. |

(56) References Cited

U.S. PATENT DOCUMENTS

| | | |
|---|---|---|
| 2006/0203505 A1 | 9/2006 | Griesinger et al. |
| 2006/0221228 A1 | 10/2006 | Kikuchi |
| 2007/0018106 A1 | 1/2007 | Zhevelev et al. |
| 2007/0061192 A1 | 3/2007 | Chew |
| 2007/0090191 A1 | 4/2007 | Schnee et al. |
| 2007/0091294 A1 | 4/2007 | Hipp |
| 2007/0096943 A1 | 5/2007 | Arnold et al. |
| 2007/0205918 A1 | 9/2007 | Riesco Prieto et al. |
| 2007/0222639 A1 | 9/2007 | Giles et al. |
| 2007/0228262 A1 | 10/2007 | Cantin et al. |
| 2007/0255525 A1 | 11/2007 | Lee et al. |
| 2008/0006762 A1 | 1/2008 | Fadell et al. |
| 2008/0172171 A1 | 7/2008 | Kowalski |
| 2008/0186470 A1 | 8/2008 | Hipp |
| 2008/0309914 A1 | 12/2008 | Cantin et al. |
| 2009/0027185 A1 | 1/2009 | Daura Luna et al. |
| 2009/0102699 A1 | 4/2009 | Behrens et al. |
| 2009/0243822 A1 | 10/2009 | Hinninger et al. |
| 2009/0251680 A1 | 10/2009 | Farsaie |
| 2009/0267784 A1 | 10/2009 | Braghiroli et al. |
| 2009/0323741 A1 | 12/2009 | Deladurantaye et al. |
| 2010/0066527 A1 | 3/2010 | Liou |
| 2010/0117812 A1 | 5/2010 | Laubinger et al. |
| 2010/0141765 A1* | 6/2010 | Capello et al. .............. 348/149 |
| 2010/0191418 A1 | 7/2010 | Mimeault et al. |
| 2010/0194595 A1 | 8/2010 | Mimeault et al. |
| 2010/0214554 A1 | 8/2010 | Audier et al. |
| 2010/0277713 A1 | 11/2010 | Mimeault |
| 2010/0309024 A1 | 12/2010 | Mimeault |
| 2011/0006188 A1 | 1/2011 | Lin |
| 2011/0115409 A1 | 5/2011 | Schwartz et al. |
| 2011/0115645 A1 | 5/2011 | Hall et al. |
| 2011/0134249 A1 | 6/2011 | Wood et al. |
| 2011/0235028 A1 | 9/2011 | Rohrseitz |

FOREIGN PATENT DOCUMENTS

| | | |
|---|---|---|
| DE | 29617413 | 11/1996 |
| DE | 19823135 | 11/1999 |
| DE | 19921449 | 1/2001 |
| DE | 69710579 | 8/2002 |
| DE | 10247290 | 4/2004 |
| DE | 19604338 | 7/2004 |
| DE | 102004035856 | 3/2005 |
| DE | 202005010816 | 11/2005 |
| DE | 102006025020 | 11/2007 |
| DE | 202008007078 | 10/2008 |
| DE | 102007038973 | 2/2009 |
| DE | 102009013841 | 9/2009 |
| DE | 102004016025 | 5/2010 |
| DE | 102008043880 | 5/2010 |
| EP | 0318260 | 5/1989 |
| EP | 0612049 | 9/1989 |
| EP | 0476562 | 3/1992 |
| EP | 0259445 | 8/1993 |
| EP | 0494815 | 12/1996 |
| EP | 0838695 | 4/1998 |
| EP | 0612049 | 9/1998 |
| EP | 0988624 | 3/2000 |
| EP | 0912970 | 4/2000 |
| EP | 1034522 | 9/2000 |
| EP | 0798684 | 1/2001 |
| EP | 0779990 | 3/2003 |
| EP | 0784302 | 3/2003 |
| EP | 0935764 | 3/2003 |
| EP | 1296302 | 3/2003 |
| EP | 0789342 | 6/2003 |
| EP | 0866434 | 6/2004 |
| EP | 0834424 | 11/2004 |
| EP | 1220181 | 8/2005 |
| EP | 1521226 | 6/2006 |
| EP | 1049064 | 9/2006 |
| EP | 0904552 | 3/2007 |
| EP | 1052143 | 7/2007 |
| EP | 1542194 | 5/2009 |
| EP | 1048961 | 7/2009 |
| EP | 2106968 | 10/2009 |
| EP | 1224632 | 12/2009 |
| EP | 2136550 | 12/2009 |
| EP | 1435036 | 1/2010 |
| EP | 1611458 | 4/2010 |
| EP | 1997090 | 9/2010 |
| EP | 1859990 | 4/2011 |
| FR | 2690519 | 10/1993 |
| FR | 2743150 | 7/1997 |
| FR | 2743151 | 7/1997 |
| FR | 2749670 | 12/1997 |
| FR | 2910408 | 6/2008 |
| GB | 2264411 | 8/1993 |
| GB | 2311265 | 9/1997 |
| GB | 2354898 | 7/2003 |
| GB | 2369737 | 2/2005 |
| GB | 2399968 | 2/2005 |
| GB | 2431498 | 4/2007 |
| GB | 2445767 | 7/2008 |
| JP | 2059608 | 2/1990 |
| JP | 2002059608 | 2/1990 |
| JP | 0414390 | 5/1992 |
| JP | 04145391 | 5/1992 |
| JP | 09178786 | 7/1997 |
| JP | 2004102889 | 4/2004 |
| JP | 2005-170184 | 6/2005 |
| JP | 2006021720 | 1/2006 |
| JP | 2006507180 | 3/2006 |
| JP | 2006172210 | 6/2006 |
| JP | 2006258598 | 9/2006 |
| JP | 2006521536 | 9/2006 |
| JP | 2007121116 | 5/2007 |
| WO | 8705138 | 8/1987 |
| WO | 9203808 | 3/1992 |
| WO | 9634252 | 10/1996 |
| WO | 9904378 | 1/1999 |
| WO | 0139153 | 1/2001 |
| WO | 0185491 | 11/2001 |
| WO | 0215334 | 2/2002 |
| WO | 03000520 | 1/2003 |
| WO | 03007269 | 1/2003 |
| WO | 2004010402 | 1/2004 |
| WO | 2004027451 | 4/2004 |
| WO | 2004036244 | 4/2004 |
| WO | 2004100103 | 11/2004 |
| WO | 2005008271 | 1/2005 |
| WO | 2006031220 | 3/2006 |
| WO | 2006044758 | 4/2006 |
| WO | 2006082502 | 8/2006 |
| WO | 2006092659 | 9/2006 |
| WO | 2007005942 | 1/2007 |
| WO | 2007071032 | 6/2007 |
| WO | 2007096814 | 8/2007 |
| WO | 2008037049 | 4/2008 |
| WO | 2008121648 | 10/2008 |
| WO | 2008154736 | 12/2008 |
| WO | 2008154737 | 12/2008 |
| WO | 2009087536 | 7/2009 |
| WO | 2009-104955 | 8/2009 |
| WO | 2009104955 | 8/2009 |
| WO | 2009117197 | 9/2009 |
| WO | 2009013739 | 10/2009 |
| WO | 2010033024 | 3/2010 |
| WO | 2010057697 | 5/2010 |
| WO | 2010069002 | 6/2010 |
| WO | 2010122284 | 10/2010 |
| WO | 2010144349 | 12/2010 |
| WO | 2011015817 | 2/2011 |
| WO | 2011025563 | 3/2011 |
| WO | 2011055259 | 5/2011 |
| WO | 2011077400 | 6/2011 |

OTHER PUBLICATIONS

The Vehicle Detector Clearinghouse, "A Summary of Vehicle Detection and Surveillance Technologies used in Intelligent Transportation System" Fall 2000, Southwest Tehnology Development

(56) References Cited

OTHER PUBLICATIONS

Institute (SWTDI) at New Mexico State University (NMSU), sponsored in cooperation with U.S. Department of Transportation FHWA, available at http://www.fhwa.dot.gov/ohim/tvtw/vdstits.

U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm.

United States Department of Transportation, Research and Innovative Technology Administration, 5.3. Infrared Detectors, available at http://ntl.bts.gov/DOCS/96100/ch05/body_ch05_03.html on Sep. 16, 2009.

Tayfun Kon, Thesis, "Collison Warning and Avoidance System for Crest Vertical Curves", Virginia Tech, May 4, 1998, Appendix 82, pp. 51-92, published on Digital Library and Archives, University Libraries of Virginia Tech, VA.

Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detector%20Technologies.doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT 85H on Sep. 16, 2009.

Dimitri Loukakos, Active Laser Infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

GENEQ Inc., Passive Infrared Detector for Traffic Data Acquisition, Model IR 250, Department of Meteorology, available at http://www.geneq.com/catalog/en/ir250.html on Sep. 16, 2009.

Akindinov et al., "Detection of Light Pulses Using an Avalanche-Photodiode Array with a Metal-Resistor-Semiconductor Structure", Instruments and Experimental Techniques, Nov. 2004, vol. 48, No. 3 205, pp. 355-363, Russia.

Braun et al., "Nanosecond transient electroluminescence from polymer lightemitting diodes", Applied Physics Letters Dec. 1992, vol. 61, No. 26, pp. 3092-3094, California.

* cited by examiner

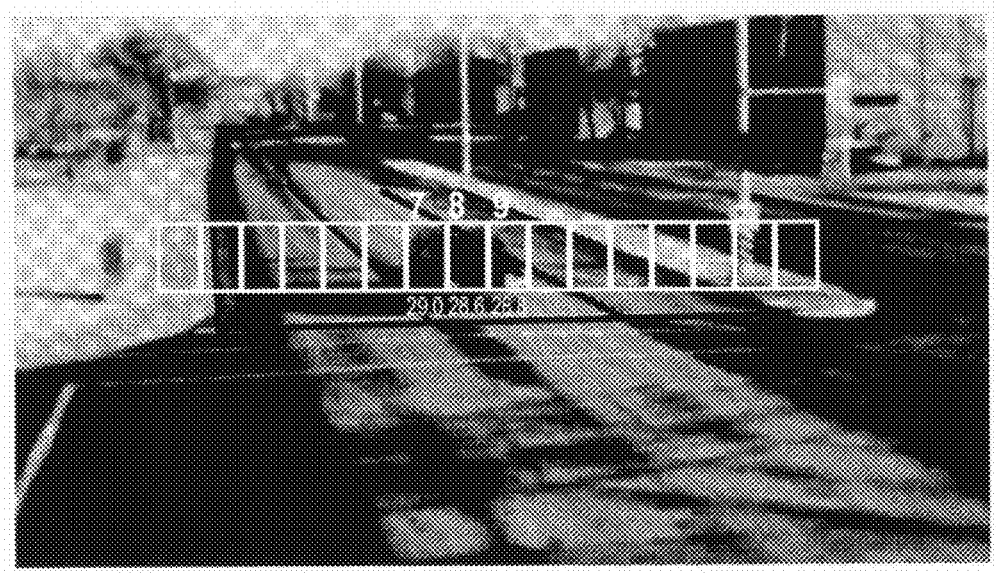
FIGURE 2A — Photograph

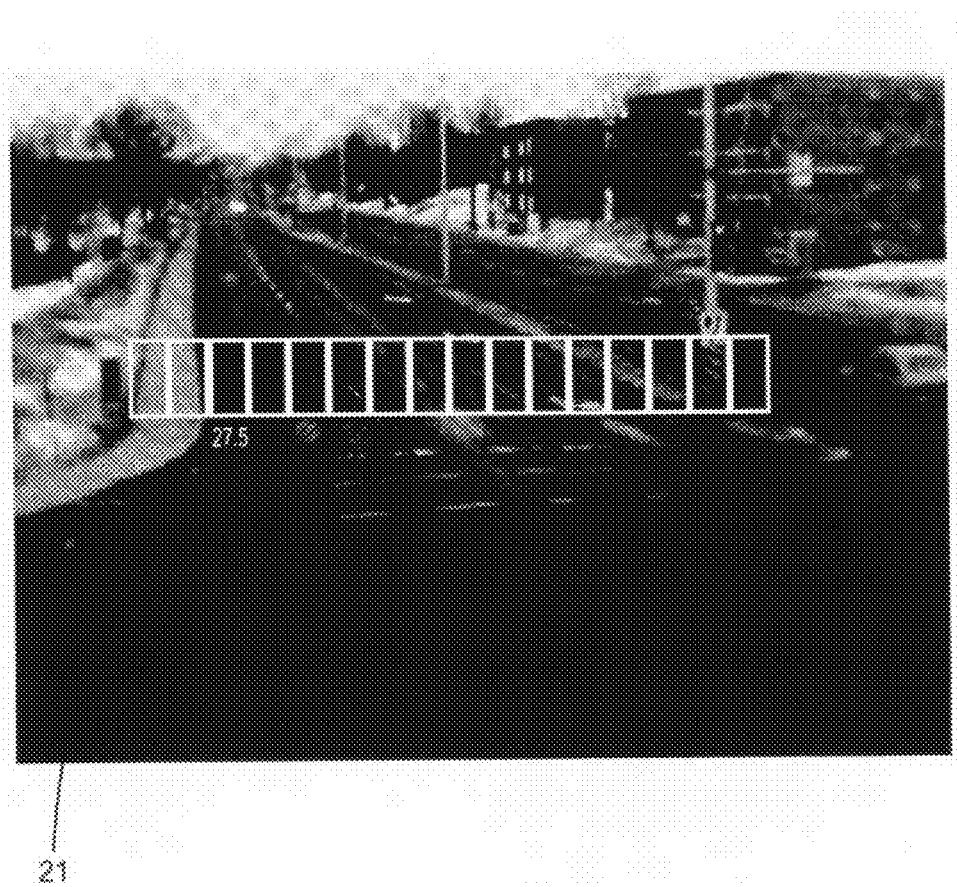
FIGURE 2B — Photograph

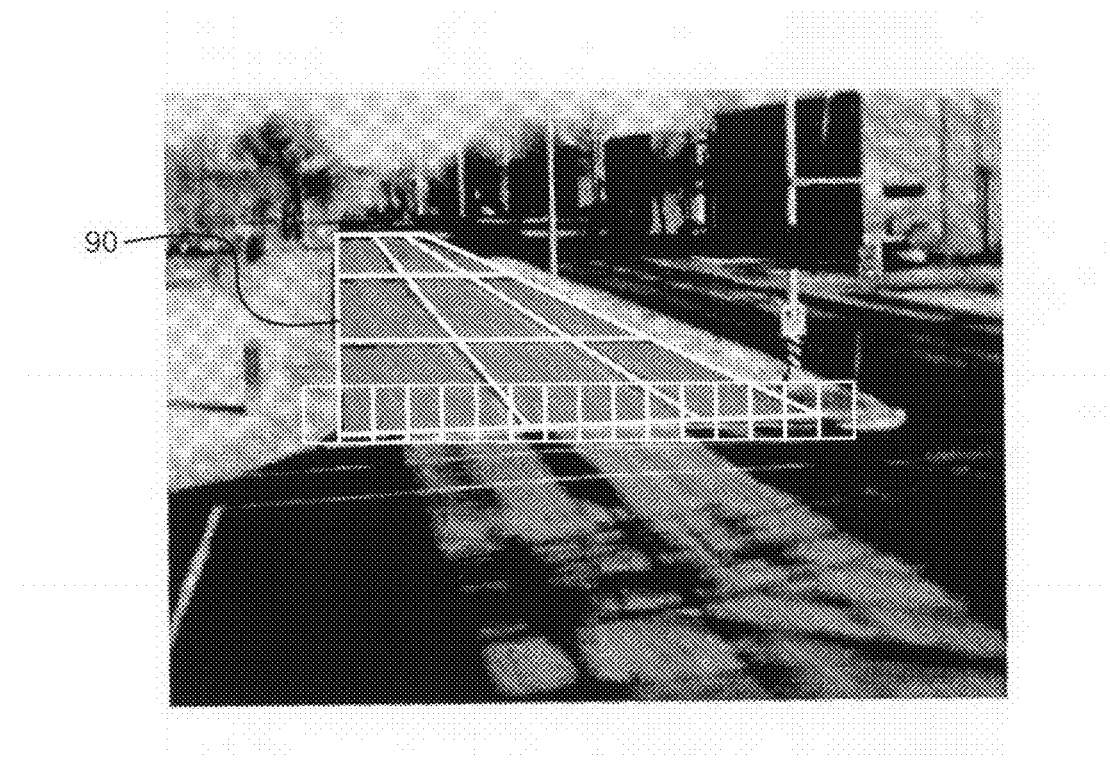
FIGURE 9A — Photograph

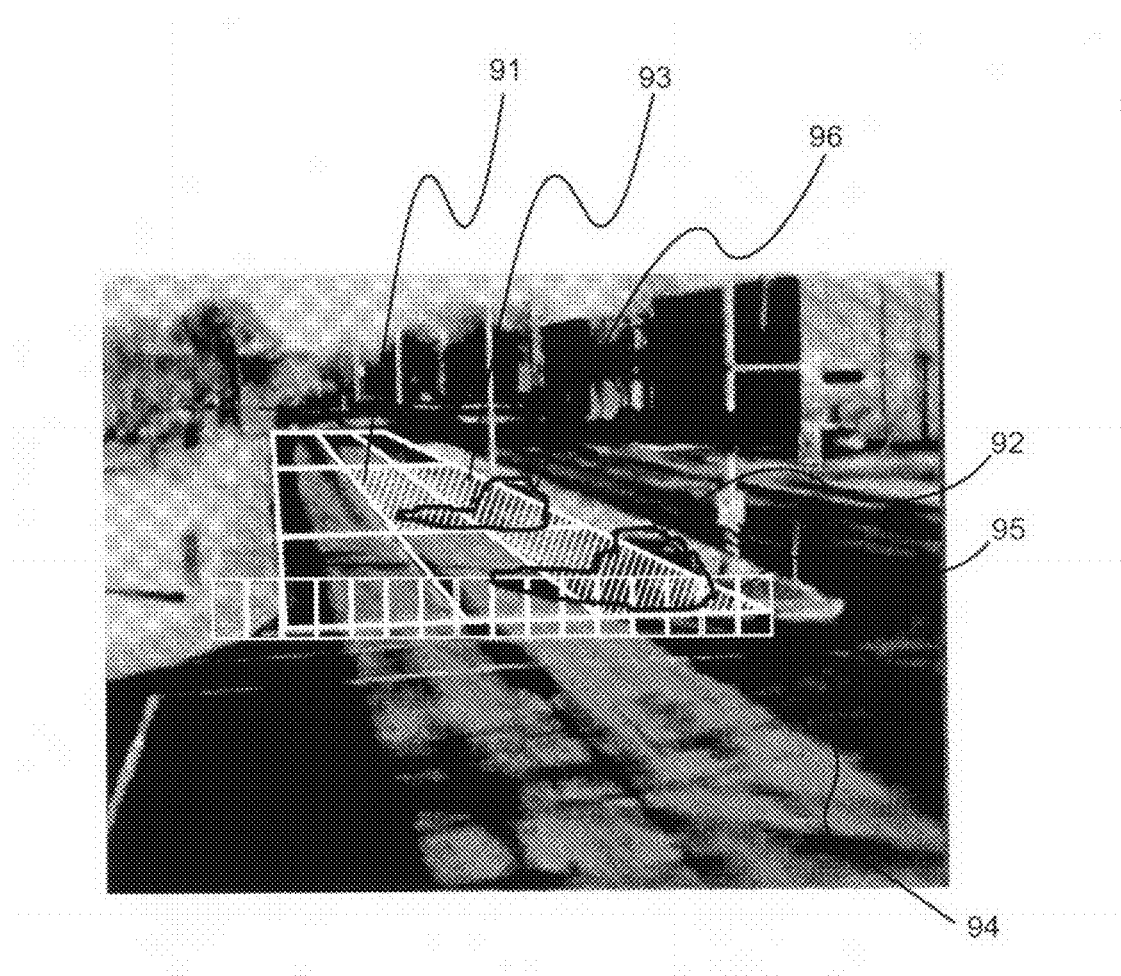
FIGURE 9B — Photograph

ACTIVE 3D MONITORING SYSTEM FOR TRAFFIC DETECTION

CROSS-REFERENCE TO RELATED APPLICATIONS

The present application is a national phase entry of PCT Application No. PCT/IB2010/056037, entitled "ACTIVE 3D MONITORING SYSTEM FOR TRAFFIC DETECTION", filed on Dec. 22, 2010; which in turn claims priority from U.S. provisional application No. 61/289,211 filed Dec. 22, 2009, the specifications of which are hereby incorporated by reference.

The present application is related to co-pending U.S. application Ser. No. 12/664,744 filed on Dec. 15, 2009 which is a national phase entry in the United States of PCT application number PCT/CA08/01161 filed on Jun. 18, 2008 which in turn claims priority of U.S. provisional application No. 60/944,658 filed Jun. 18, 2007, the specification of which are hereby incorporated by reference.

TECHNICAL FIELD

The present invention relates to a system and methods for traffic detection and more particularly to an optical system that senses the presence of vehicles and objects within predetermined zones through the use of an active three-dimensional sensor based on the time-of-flight ranging principle.

BACKGROUND

Growth in transportation demand causes traffic congestion. The impact of congestion represents inefficient use of fuel and hours of delay. Intelligent Transportation Systems (ITS) using advanced technologies have the potential to increase traffic efficiency of the existing facilities.

Advanced Management Transportation Systems (ATMS) rely on traffic data from different kinds of detectors divided into two categories: intrusive and non-intrusive. One type of intrusive detectors involves inductive loop detectors that are still a common technology for detecting vehicles even if that technology has disadvantages such as lengthy disruption to the traffic flow during installation and maintenance, relatively high cost, high failure rate and inflexibility. Other detectors, like cameras with video processing, also have their limitations and the market is still searching for alternatives to inductive loops.

Information from sensors is the base point in the optimization of traffic management, particularly adaptive timing for traffic light signalling. Well managed adaptive timing can result in reductions of fuel consumption, fewer vehicle emissions and a reduction in waste of time. However, sensor mounting requirements are often costly and cause traffic disruption during installation.

SUMMARY

According to one broad aspect of the invention, there is provided a method for detecting the presence of an object in a detection zone using a traffic detection system.

According to another broad aspect of the present invention, there is provided a system for detecting the presence of an object in a detection zone using a traffic detection system.

In one embodiment, the traffic detection system includes an optical unit having an emitter module emitting pulses within a predetermined field of emission; a receiver module receiving a part of the pulses reflected by an object in the field of emission toward a field of view of the receiver module, the field of view including a plurality of adjacent detection channels, the receiver module acquiring and converting the received pulses into a corresponding plurality of a digital signal waveforms; an image sensing module providing an image that encompasses the field of emission of the emitter module and the field of view of the receiver module.

In one embodiment, the method comprises providing a status overlay image for the field of view including the image and a visual indication on the image of an outline of the plurality of adjacent detection channels; positioning the field of view of the receiver module to cover the detection zone using the status overlay image; obtaining the plurality of digital signal waveforms using the traffic detection system; detecting a signal echo in one of the digital signal waveforms at a position within the field of view, the signal echo being caused by the presence of the object in the field of view; determining a location in the field of view for the object using the position; storing the location for the object.

In one embodiment, the method comprises sending the stored location to an external processor.

In one embodiment, the detection zone is defined along a stop bar of an approach of a road intersection.

In one embodiment, the method comprises identifying which detection channel produced the signal waveform in which the signal echo is detected; using the status overlay image, determining a traffic lane corresponding to the identified detection channel; detecting the presence of the object in the determined traffic lane.

In one embodiment, the method comprises providing a minimum and a maximum detection distances from the optical unit within the field of view for the detection channels; generating a call if the signal echo is within the minimum and maximum detection distances for the determined traffic lane; sending the call to a traffic controller.

In one embodiment, the method comprises detecting a signal echo in the signal waveform at a position closer to the optical unit than the minimum detection distance and holding the call.

In one embodiment, the object is one of a moving object and a stationary object.

In one embodiment, the object is a vehicle.

In one embodiment, the method comprises obtaining a replica of a waveform of the emitted pulse; numerically correlating each the signal waveforms with the replica; wherein detecting the signal echo includes detecting the signal echo in the correlated signal waveforms.

In one embodiment, the method comprises providing a threshold amplitude for the echo, the detecting a signal echo comprises comparing an amplitude of the signal echo to the threshold amplitude, the threshold amplitude being one of an amplitude absolute value and an amplitude relative value varying as a function of the position.

In one embodiment, the method comprises determining an amplitude of the signal echo, grouping compatible echoes based on echo properties in an echo group, the echo group being a set of signal echoes in different channels, the echo properties being at least one of the location being substantially the same, the amplitude being substantially the same and an overall group location of the echo group including the location.

In one embodiment, the method comprises matching the group to an object type.

In one embodiment, the emitter module is an optical emitter module, the pulses are short light pulses, the field of emission is a field of illumination, the receiver module is an optical receiver module, the pulses reflected are pulses of light reflected.

In one embodiment, the optical emitter module emits short pulses of light at a wavelength invisible to the human eye.

In one embodiment, the method comprises providing a filter for the optical receiver module, the method comprises receiving the pulses of reflected light at a reflection wavelength matching an emission wavelength of the short light pulses emitted by the optical emitter module.

In one embodiment, the traffic detection system includes a pan and tilt assembly for the optical unit, the pan and tilt assembly being adapted to pivot the optical unit in a controlled manner about at least one of three orthogonal axes; the method comprises orienting the pan and tilt assembly to coarsely point the optical unit toward the detection zone.

In one embodiment, the method comprises using the status overlay image and the pan and tilt assembly to pivot the optical unit and allow a precise pointing of the optical unit common line of sight toward the detection zone.

In one embodiment, the method comprises identifying permanent markers in the status overlay image and using the identified permanent markers to precisely align the optical unit using the pan and tilt assembly.

In one embodiment, the method comprises providing at least one sensor, each sensor being at least one of a temperature sensor, a inclinometer, a compass, accelerometer and a global positional system, the method comprises using information captured by the at least one sensor for at least one of the positioning the field of view, the detecting the signal echo and the determining the location.

In one embodiment, the method comprises providing an angular position sensor for generating information about a current angular position of the optical unit, the method comprises using the information about the current angular position for the positioning the field of view.

In one embodiment, the method comprises repeating the steps of obtaining, detecting and determining for a number of repetitions; tracking the location of the object in the field of view in each repetition; determining a displacement speed of the object in the field of view using successive ones of the tracked locations for the object.

In one embodiment, the method comprises sending the status overlay image to an external processor.

In one embodiment, the method comprises repeating the providing an image that encompasses the field of view by the image sensing module to obtain a sequence of images, carrying out compression on the sequence of images, generating a compressed video output and sending the compressed video output to an external processor.

In one embodiment, the method comprises applying image processing on the image to detect candidate objects, extracting a position of the candidate objects in the field of view from the image, using the extracted position to guide the determining the location for the object.

In one embodiment, the method comprises applying image processing on the image to detect candidate objects, extracting a position of the candidate objects in the field of view from the image, using the extracted position to generate the call.

In one embodiment, the method the emitter module and the receiver module provide a ranging instrument, the determining the location in the field of view for the object using the position including calculating the time taken by the emitted pulses to travel from the optical unit to the object and return back to the optical unit, the receiver module numerically processing the signal waveform acquired for a period of time after the emission of the pulse.

In one embodiment, the positioning the field of view of the receiver module to cover the detection zone using the status overlay image comprises: sending the status overlay image to an external processor; receiving a detection zone location information; positioning the field of view using the detection zone location information.

In one embodiment, the detection zone location information includes at least one of an outline for the detection zone, a width of a traffic lane, an installation height for the optical unit, the minimum distance and the maximum distance.

In one embodiment, the positioning the field of view of the receiver module to cover the detection zone using the status overlay image comprises: sending a series of the status overlay image to an external processor; receiving a validation for a detected object located in the detection zone on at least one of status overlay image of the series; determining the detection zone location based on the validation; positioning the field of view using the detection zone location.

In one embodiment, the positioning the field of view of the receiver module to cover the detection zone using the status overlay image comprises: sending the status overlay image to an external processor; storing an aerial view of an area surrounding and including the detection zone; receiving data concerning an installation of the optical unit; comparing the status overlay image to the aerial view and using the data to determine a detection zone location for the detection zone in the status overlay image; positioning the field of view using the detection zone location.

Throughout this specification, the term "non-visible" is intended to be a synonym of the terms "invisible" and "non-visible" and to be an antonym to the word "visible". It should be understood that "visible light" refers to light emitted at wavelengths which are visible to the human eye. Similarly, "invisible light" refers to light emitted at wavelengths which are not visible to the human eye.

Throughout this specification, the term "vehicle" is intended to include any movable means of transportation for cargo, humans and animals, not necessarily restricted to ground transportation, including wheeled and unwheeled vehicles, such as, for example, a truck, a bus, a boat, a subway car, a train wagon, an aerial tramway car, a ski lift, a plane, a car, a motorcycle, a tricycle, a bicycle, a Segway™, a carriage, a wheelbarrow, a stroller, etc.

Throughout this specification, the term "environmental particle" is intended to include any particle detectable in the air or on the ground and which is typically caused by an environmental, chemical or natural phenomenon. It includes fog, rain, snow, is smoke, gas, smog, black ice, hail, etc.

Throughout this specification, the term "object" is intended to include a moving object and a stationary object. For example, it can be a vehicle, an environmental particle, a person, a passenger, an animal, a gas, a liquid, a particle such as dust, a pavement, a wall, a post, a sidewalk, a ground surface, a tree, etc.

BRIEF DESCRIPTION OF THE DRAWINGS

The accompanying drawings, which are included to provide a better understanding of the main aspects of the system and method and are, incorporated in and constitute a part of this specification, illustrate different embodiments and together with the description serve to explain the principles of the system and method. The accompanying drawings are not intended to be drawn to scale. In the drawings:

FIGS. 2A and 2B are photographs which show example status overlay images of a road approach captured by an image sensing module integrated in a traffic detection system, FIG. 2A shows a vehicle detected in the middle lane, FIG. 2B shows a bicycle detected in the right lane;

FIGS. 9A and 9B are photographs which show examples of the use of video content analysis, FIG. 9A shows the area with nine specific zones of interest with the overlay of the 3D sensor, FIG. 9B shows two detected vehicles.

FIG. 18A shows a detected vehicle, FIG. 18B shows a detected vehicle moving forward, FIG. 18C shows a detected vehicle still moving forward with its back at the same distance from the optical unit than the detected pavement, FIG. 18D shows a detected vehicle still moving with its back further than the detected pavement.

DETAILED DESCRIPTION

1. Use, Set-Up, Basic Principles and Features

Reference will now be made in detail to specific embodiments. The system and method may however, be embodied in many different forms and should not be construed as limited to the embodiments set forth in the following description.

Figure 1:
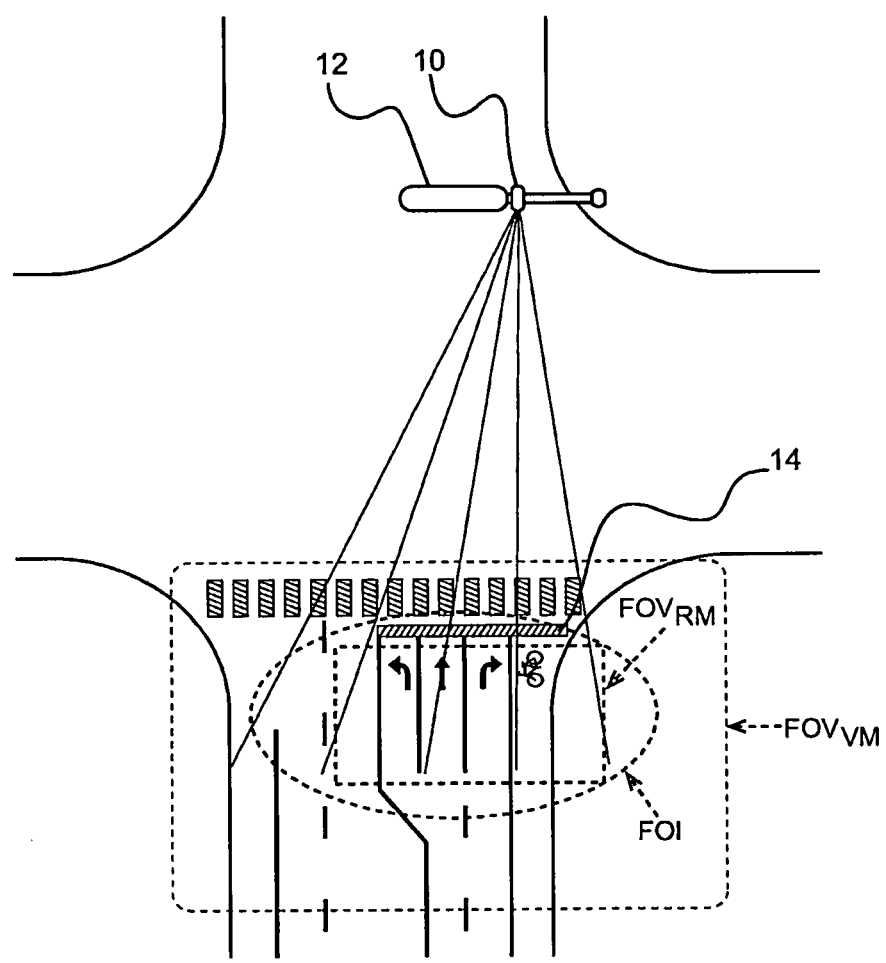
FIG. 1 shows a schematic aerial view of a road intersection having a single traffic light mast arm on which is mounted a traffic detection system with its line of sight pointing towards an approach of the intersection.

The primary use and example mounting configuration of the traffic detection system can be better appreciated with reference to FIG. 1, which depicts a schematic aerial view of the center portion of a road intersection with one approach of the intersection being shown in detail. For better legibility, the intersection has been sketched with a single traffic light assembly mounted on a traffic light mast arm. The traffic detection system 10 is shown in the figure as a separate stand-alone unit mounted beside an already existing traffic light assembly 12. Note, however, that the system can be mounted on (or integrated in) other types of road infrastructures, buildings, check points, etc. As an alternative to stand-alone units, one can also imagine the system embodied in the form of a unit designed and fabricated for integration within a newly manufactured traffic light assembly. The bottom part of the figure shows the approach of the intersection that faces the traffic light assembly and that is subjected to continuous detection by the system. This exemplary approach comprises three adjacent traffic lanes (incoming traffic only) for vehicles as well as an outer lane intended for cyclists, pedestrians and the like. Note that the two leftmost lanes for outgoing traffic are not typically monitored by the system, but detection of the vehicles in those lanes can also be done and can be processed to add information about traffic flow through the intersection. This information can be used by the Advanced Traffic Controller. The traffic detection system is intended to detect any type of vehicle, including a car vehicle, a truck, a motorcycle and a bicycle and can even detect objects such as a pedestrian that can be present within a predetermined zone of the approach. The vehicles can either be moving or stopped while waiting for the next green light phase. It is possible to detect a number of vehicles that line up (queue line) in any lane of the approach. Information from the image sensor can also be used to determine the length of the queue line as will be explained in further details below.

In one embodiment of the system, the overall detection zone consists in a set of contiguous rectangular areas, which can have the same dimensions, and which extend along the monitored lanes over a distance of typically several meters away from the location of the stop-bar line 14 of the approach. The projection on a horizontal plane (footprint) of the field of view ($FOV_{RM}$ in the figure) of the traffic detection system defines the overall detection zone. The $FOV_{RM}$ is separated in several rectangular areas and each rectangular area (referred to as simply a detection zone from here on) is monitored by a separate optical detection channel implemented in the traffic detection system. For example, the outline of the $FOV_{RM}$ can be separated into sixteen adjacent detection zones. However, it should be appreciated that the dimensions, aspect ratios, exact locations of the detection zones as well as their number are examples.

The system allows optically monitoring a portion of a road intersection by using a plurality of independent detection zones. The system then enables traffic detection for each individual lane of the approach while providing substantial flexibility in configuring the system to the momentary traffic conditions and to the specific characteristics of the intersection. For instance, FIG. 1 readily suggests that the width of each lane of the approach can be covered by more than a single detection channel of the traffic detection system. The outputs from a number of adjacent detection channels can be combined together to form a composite detection channel associated to a given lane. This scheme, which can be denoted as lane mapping, may help in promoting a higher detection probability for the system. Detection calls will be issued when appropriate. It could result in lower numbers of missed calls and of false positives during any given period of time. A detection call is a trigger sent to the traffic controller. A missed call refers here to the event wherein a vehicle present in a lane has not been detected, whereas a false positive describes the event wherein the system signals the presence of a vehicle in a lane that is free from any vehicle. The process of lane mapping does not require any change in the hardware or set-up of the traffic detection system since it can be implemented via the software that controls the operation of the system. Monitoring separately the outputs of adjacent detection channels that cover a same lane can give a better spatial resolution of the system along the width of the lane, thus enabling a form of spatially-resolved detection. This scheme favours reliable detection of small-sized vehicles (motorcycles, bicycles), pedestrians, and objects that to could have been accidentally dropped on the road pavement. Both detection schemes outlined in the preceding lines are not mutually exclusive. They only consist in two different schemes that could form part of an extended set of detection schemes implemented in the control software of the traffic detection system, all of these schemes being run in parallel through proper real-time parallel processing of the outputs from the optical detection channels.

By way of example, a useful set of detection schemes may include a dedicated scheme implemented for real-time tracking of vehicles whose trajectories overlap two adjacent lanes of the approach as well as of vehicles that suddenly switch from one lane to the other when arriving at the intersection. Another detection scheme may enable real-time tracking of pedestrians or cyclists that are crossing an approach of the intersection. Such an event can be detected from the apparition of a slowly-moving object that crosses the series of detection zones in succession, one after the other, with its distance remaining close to that of the stop-bar line.

Compared to traffic detection systems that make use of video cameras, the system deals in a more efficient manner with occlusion events. These events refer to nearly all of the detection zones being temporarily hidden by a large-sized object such a truck, which could block the whole field of view of the traffic detection system when performing a left turn towards a lane for outgoing traffic in the same approach than the currently monitored lanes. Occlusion events can be easily managed by the traffic detection system by the acquisition of a signal coming from an object located very close to the system (the truck would be temporarily located in the center area of the intersection) and which appears in nearly all of the detection channels. This kind of event would command the traffic detection system to stay in a standby mode, keeping its output detection signals in their current states until the optical access to the detection zones is progressively recovered. Finally, a detection scheme may be implemented for identification of special events such as the presence of a broken down vehicle in a monitored lane, wherein a continuous signal from a stationary object would be detected for an extended period of time. Such special events are often handled with some difficulty by inductive detection loops embedded in the road pavement, whereas a detection scheme can be easily programmed in the traffic detection system for reliably reporting these events.

The traffic detection system 10 is said to be active due to the fact that it radiates light having predetermined characteristics over the overall detection zone. The active nature of the system enables its operation all around the clock and under largely-varying daytime/night-time lighting conditions, while making it relatively immune to disturbances coming from parasitic light of various origins. The outline of the portion of the intersection that is lighted by the traffic detection system is outlined in FIG. 1 by the ellipse sketched in dashed line. The two-dimensional angular extent of the radiated light defines the field of illumination (FOI in the figure) of the system. It can be noted that the perimeter of the FOI should be adapted to the size of the overall detection zone to promote an efficient use of the radiated light, thus meaning that, similarly to the overall detection zone, the FOI usually displays a sizable asymmetry. As it will be explained in further details below, an image sensing device can be integrated in the traffic detection system that forwards images to a remote operator to help him in performing a fine adjustment of the location of the overall detection zone of the system. A schematic example of a portion of the intersection that is visible in the images is depicted in FIG. 1 by the rectangle drawn using a dotted line, defining the field of view ($FOV_{VM}$) of the image sensing device. By way of example, an example image of a road approach captured by an image sensing device is shown in FIG. 2A along with the perimeters of a set of 16 contiguous detection zones visible in white overlay on the image. The outlines of the three lanes for incoming traffic are also delineated with black lines. In this example, the vehicle present in the centermost lane would be detected in the three adjacent zones 7 to 9 at a respective detected distance between 28.6 meters to 29.0 meters. Note that the overall detection zone is wide enough to cover the three incoming lanes as well as a major portion of the sidewalk and of the median strip.

In addition to the detection of vehicles present within a two-dimensional detection zone, the active nature of the traffic detection system provides an optical ranging capability that enables measurement of the instantaneous distances of the detected vehicles from the system. This optical ranging capability is implemented via the emission of light in the form of very brief pulses along with the recordal of the time it takes to the pulses to travel from the system to the vehicle and then to return back to the system. Those skilled in the art will readily recognize that the optical ranging is performed via the so-called time-of-flight (TOF) principle, of widespread use in optical rangefinder devices. Note, however, that the analogy between optical rangefinders and the traffic detection system should not be extended further since most optical rangefinders rely on analog peak detection of the light pulse signal reflected from a remote object followed by its comparison with a predetermined amplitude threshold level. On the opposite, the traffic detection system numerically processes the signal waveform acquired for a certain period of time after the emission of a light pulse. The traffic detection system can then be categorized as a full-waveform LIDAR (Light Detection And Ranging) instrument).

A virtual loop can be defined and will generate a call when associated channels will detect an object within a predetermined range (between a minimum and a maximum distance). As can be seen in FIG. 2A, a virtual loop in the middle car lane can be defined using channels 7, 8 and 9. A minimum and maximum distance can be preset to determine the detection zone. When an object is detected in the predetermined channels within the predetermined range, a call can be sent to the traffic controller. The system can be able to compensate for the perspective view it has of the lane (when the sensor is not positioned directly facing the lane) and can use a reference coordinate system.

The traffic detection system can emit light pulses at a very high rate so that it can determine, in real time, the speed at which a vehicle is approaching or leaving the intersection. The speed measurement is easily carried out by measuring the rate at which the distance of the detected vehicle changes with time. When a certain number of successive positions are available for the detected vehicle, such as, for example, a number greater than five, speed measurement can be improved by using a filter, such as a Kalman filter. The combination of the optical ranging capability with the monitoring over a detection zone that extends along two dimensions allows the traffic detection system to be also categorized as a three-dimensional (3D) optical monitoring system. In addition to vehicle speed measurement in zones close to road intersections, the system can provide information of great usefulness for traffic control management. This information includes, but is not limited to, the presence of vehicles at any time at a given intersection, the vehicle count during predetermined daytime or night-time periods, the relative occupancies of the traffic lanes (namely the percentage of time the detection zone is occupied by a vehicle), the classification of the vehicles at the intersection, etc. FIG. 2B shows an example of a cyclist detected in the right lane 21. The right lane 21 is highlighted.

Figure 3:
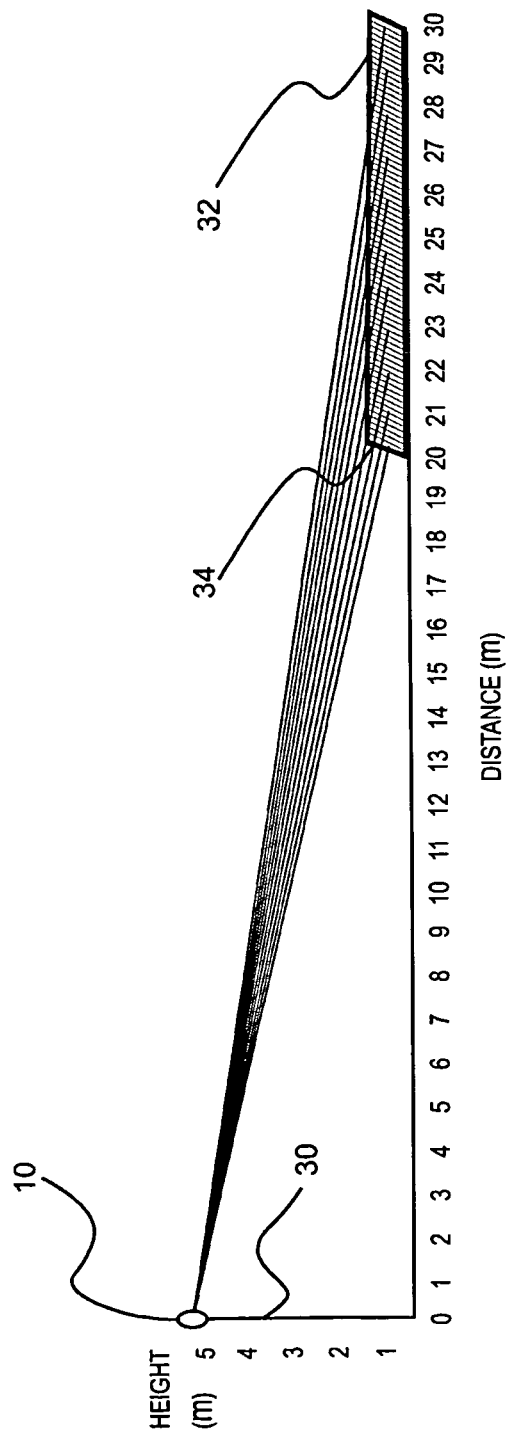
FIG. 3 is a schematic side view of a traffic detection system that emits a cone of light, showing the length of the detection zone along a given lane.

FIG. 3 schematically illustrates a traffic detection system 10 mounted on a traffic light mast arm 30 at an example height of 5 m above the ground level for detection over a zone 32 that extends from a distance of 20 m (position of a stop-bar line 34) up to a maximum distance of about 30 m. The figure then shows that the extent of the detection zone along any given lane of a road approach is determined by factors such as the mounting height of the system, the spreading (divergence) angle of the light cone emitted from the system (vertical axis), the downwards pointing angle of the system, and the horizontal distance that separates it from the stop-bar line painted on the pavement. As a result, the length of the detection zones along the lanes depend on factors related to the optical design of the system, the design of the traffic detection system as well as on the way it is mounted on the traffic light mast arm.

Because light travels at a rapid but nevertheless finite speed, the emission of a single pulse of light by the traffic detection system will result in the subsequent reception of a brief optical signal echo starting at the time $t=2 L_{MIN}/c$ and having a duration $\Delta t=2(L_{MAX}-L_{MIN})/c$. In these expressions, c is the speed of light ($3\times10^8$ m/s) while FIG. 3 shows that $L_{MIN}$ and $L_{MAX}$ are the lengths of the slanted light propagation paths from the system to the nearest and farthest limits of the detection zone, respectively. For the specific geometrical configuration illustrated in FIG. 3, an optical signal echo would start to be recorded after a time delay $t\approx135$ ns (nanoseconds) following the emission of the light pulse, and it would end up at a time $t+\Delta t\approx205$ ns. Any vehicle present in a lane monitored by the traffic detection system would reflect the incoming light in a manner that differs substantially from the weak diffuse reflection of the light on a road pavement. The difference between the optical reflection characteristics of any vehicle and of the road pavement then produces a distinctive signal echo (signature) on which the reliable detection of the vehicle by the system is based.

The diagram of FIG. 3 also illustrates how the optical signal waveforms captured by the traffic detection system can be calibrated. The calibration process refers in the present context to the conversion of the specific time at which any feature (i.e., the echo from a vehicle) is visible in a signal waveform into a distance along the detection zone, thus allowing the position of a detected vehicle to be determined without any ambiguity along the lane in which it is currently moving. In addition, the length of a vehicle can be estimated from the duration of its distinctive signal echo. This means that, apart from the varying amplitudes of their signal echoes, vehicles of different sizes can be distinguished by the traffic detection system from the duration of the detected signal echoes.

Figure 4:
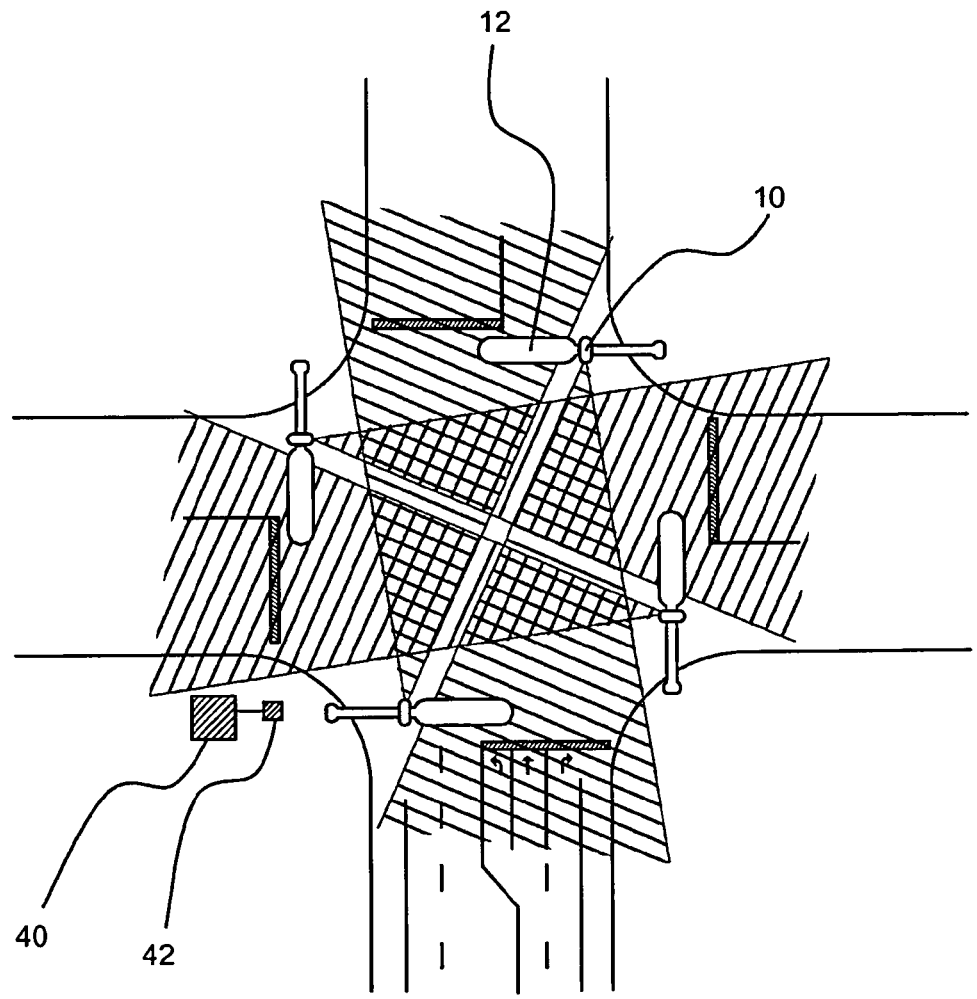
FIG. 4 is a schematic aerial view similar to FIG. 1, but showing a more detailed road intersection that includes a traffic light mast arm for each of its four approaches, each approach being covered by an individual traffic detection system mounted beside a traffic light assembly.

An example 4-way setup for the traffic detection system is schematically illustrated in FIG. 4. The figure shows an aerial view of a road intersection with each of its four approaches being monitored by a separate traffic detection system 10 mounted beside a traffic light assembly 12. In an embodiment, each traffic detection system would communicate its output detection data to a single traffic controller 40. Upon reception of the data, the traffic controller 40 would then command the phases of the four traffic light assemblies, with the objective of favoring a smooth and safe traffic flow at the intersection at any time of the day and under various weather conditions and sudden traffic events. The data from the set of traffic detection systems can be forwarded to the traffic controller via a Traffic controller interface board (not shown and typically inside the traffic controller enclosure) and proper cabling or via a wireless data link. In the latter case, the traffic controller may be connected to a remote access point 42 judiciously located in the vicinity of the intersection. The access point can be integrated in the traffic controller assembly as well. The traffic controller interface board and the remote access point can be used for data logging as well. It can be noted that the traffic controller can forward data to a traffic detection system to provide information about the current phase and status of the traffic lights or any other information of similar nature. Some detection processing, video processing or added value features (such as video compression and data logging) for the traffic detection can be carried out using the traffic controller interface board.

Figure 5:
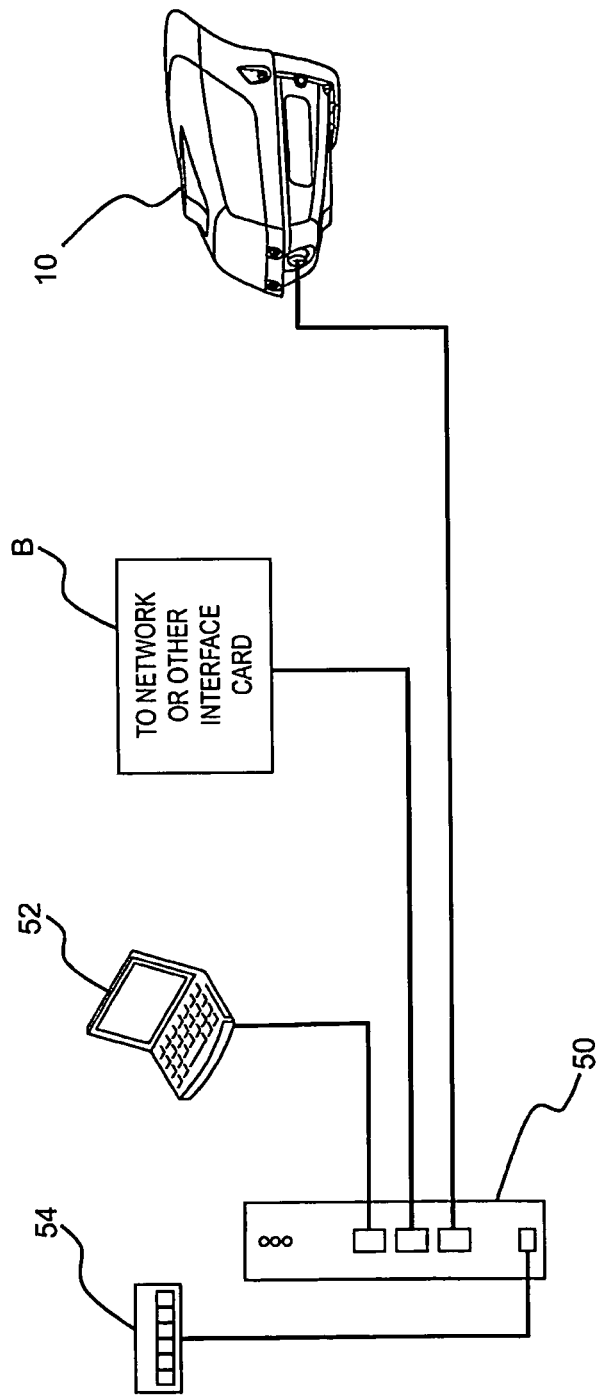
FIG. 5 shows an example of the possible interconnection between a traffic detector, a traffic controller interface board and a computer for the configuration.

Assuming that the approaches of the road intersection shown in FIG. 4 would be nearly identically configured in that example, a total of about 16 lanes would be monitored by the four traffic detection systems with the possibility to have several virtual loops by lane or to combine lanes in a single virtual loop. FIG. 4 shows a setup where a detection system with 3D sensing and image sensor can cover all the approaches in the intersection and detect and send any relevant information to optimize the traffic flow and other uses to the Advanced Traffic Controller. FIG. 5 shows an example of the interconnections between a traffic detector 10, a traffic controller interface board 50 and a computer 52 for the configuration, with a power supply 54 and a link to transmit data to external network or other interface card B. Finally, it should be noted that the location and use of the traffic detection system are not limited to intersections that control the traffic flow through the use of traffic lights. The system can be installed elsewhere along a road, or on a gantry, to perform speed measurement and counting. Another example of use is advanced detection of vehicles at distances that typically reach 50 m to more than 100 m from a road intersection. Advanced detection is often associated with the dilemma zone (or indecision zone). The dilemma zone is the zone away from an intersection, in which the driver will decide to hit the gas to cross the intersection during a yellow light phase or hit the brakes to stop at the stop line during the yellow light phase. Detection and speed measurement can be useful to hold the call until the vehicle has time to travel through the intersection, thereby avoiding placing the driver in the dilemma while in the dilemma zone.

2—Description of the Traffic Detection System: Overview

Figure 6:
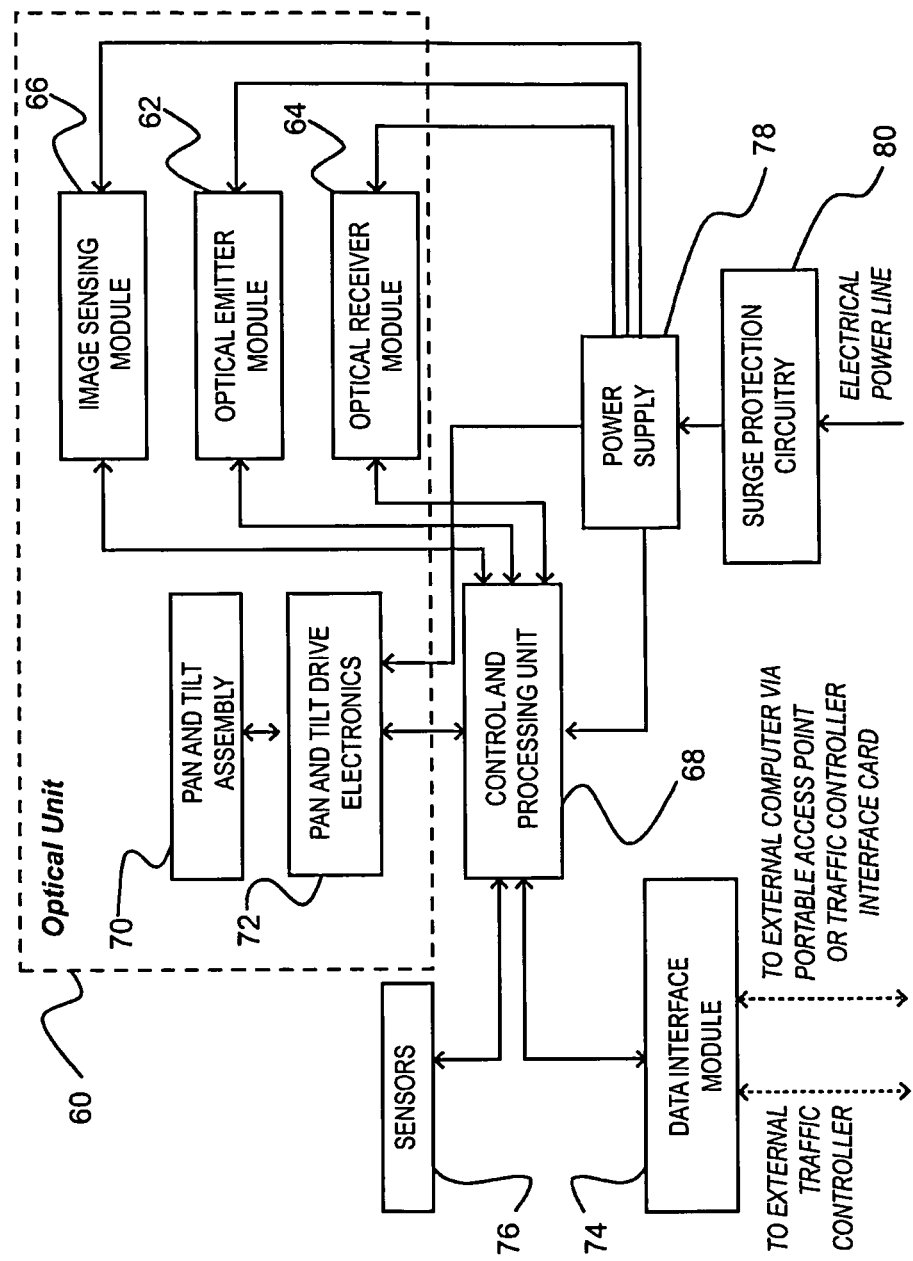
FIG. 6 is a functional bloc diagram of an example traffic detection system showing its main components and the way they are interconnected.

The functionalities of the various components integrated in an example traffic detection system can be better understood by referring to the functional block diagram shown in FIG. 6. Three modules mounted on a motorized actuator assembly form the heart of the traffic detection system, these modules being collectively grouped within an optical unit 60 in FIG. 6. The optical unit 60 then includes an optical emitter module 62 (OEM), which emits short pulses of light within a predetermined field of illumination (FOI). A part of the light diffusively reflected by the vehicles, objects and the road pavement is directed towards the collecting aperture of an optical receiver module 64 (ORM) for its optical detection and subsequent conversion into voltage waveforms. To be detected, an object should lie within the field of view of the ORM, which is defined by its optics as well as by the dimensions of its optically sensitive device. The third module of the optical unit consists of an image sensing module 66 (ISM) which provides images of the portion of the intersection area that encompasses the field of illumination of the OEM and the field of view of the ORM. All of these modules exchange data and receive commands and signals from the control and processing unit 68, which, logically, does not form part of the optical unit. The control and processing unit 68 can have various embodiments but it typically includes an acquisition sub-system for digitization of the analog signal waveforms, a pre-processing and synchronization control typically made by digital logic (e.g., by a field-programmable gated array (FPGA) board), a memory, and a processing unit. The latter consists typically in a digital signal processing (DSP) unit, a microcontroller, or an embarked personal computer (PC) board as will be readily understood. Some functions of the control and processing unit can also be integrated in the optical unit.

The control and processing unit 68 has numerous functions in the operation of the traffic detection system, one of these being the control of an actuator assembly (Pan and tilt assembly 70) via dedicated drive electronics (Pan and tilt drive electronics 72). The three modules briefly outlined in the preceding lines are rigidly secured to the attachment surface of the actuator assembly. As a consequence, these modules can pivot in a controlled manner about two orthogonal axes to allow a precise pointing of their common line of sight after the traffic detection unit has been installed in place and aligned in a coarse manner. The fine pointing of the line of sight is, for example, performed remotely by an operator via a computer device connected to the traffic controller interface card or an access point that communicates with the control and processing unit of the traffic detection system, for example through a wired or a wireless data link. The communication between the control and processing unit and the remote computer device is enabled by the operation of a data interface module 74. During normal operation of the traffic detection system, this module also allows the control and processing unit 68 to send data about the vehicles detected at the monitored intersection to an external traffic controller. The detection data outputted from the control and processing unit results from the numerical real-time processing of the voltage waveforms forwarded by the ORM. Note that the traffic controller is not part of the present system.

The suite is collectively represented by the functional block labelled SENSORS 76 in the diagram of FIG. 6. For example, the internal temperature in the system enclosure can be monitored with a temperature sensor while an is inclinometer/compass assembly may provide information about the current orientation of the system. Such information may be useful for timely detection of the line of sight that gets misaligned. The sensor suite may also include an accelerometer for monitoring in real-time the vibration level to which the system is submitted as well as a global positioning system (GPS) unit for real-time tracking of the location of the system or for having access to a real time clock. The system can be powered via a connection to an electrical power line, which also supplies the traffic light assemblies installed at the intersection. A power supply 78 provides the properly filtered DC voltages required to operate the various modules and units while their protection against any voltage surge or transient is provided by a surge protection circuitry 80. The power supply and the data link can be integrated in one connector using an interface such as Power over Ethernet (PoE).

Figure 7:
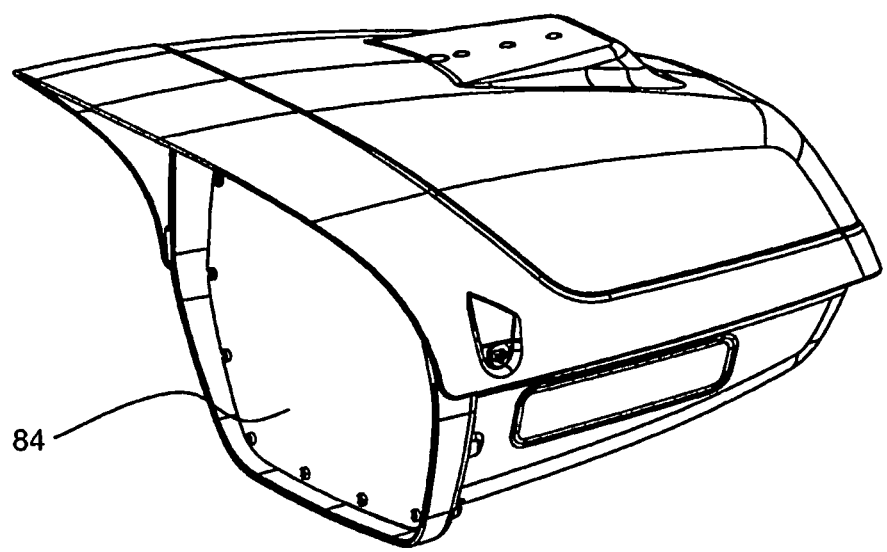
FIG. 7 shows an example of a casing for the traffic detector.

FIG. 7 shows an example casing with a window 84 for the traffic detection system and can house a more or less complete suite of monitoring instruments, each of them forwarding its output data signal to the control and processing unit for further processing or relay.

2.A—Description of the Optical Unit of the Traffic Detection System

Figure 8:
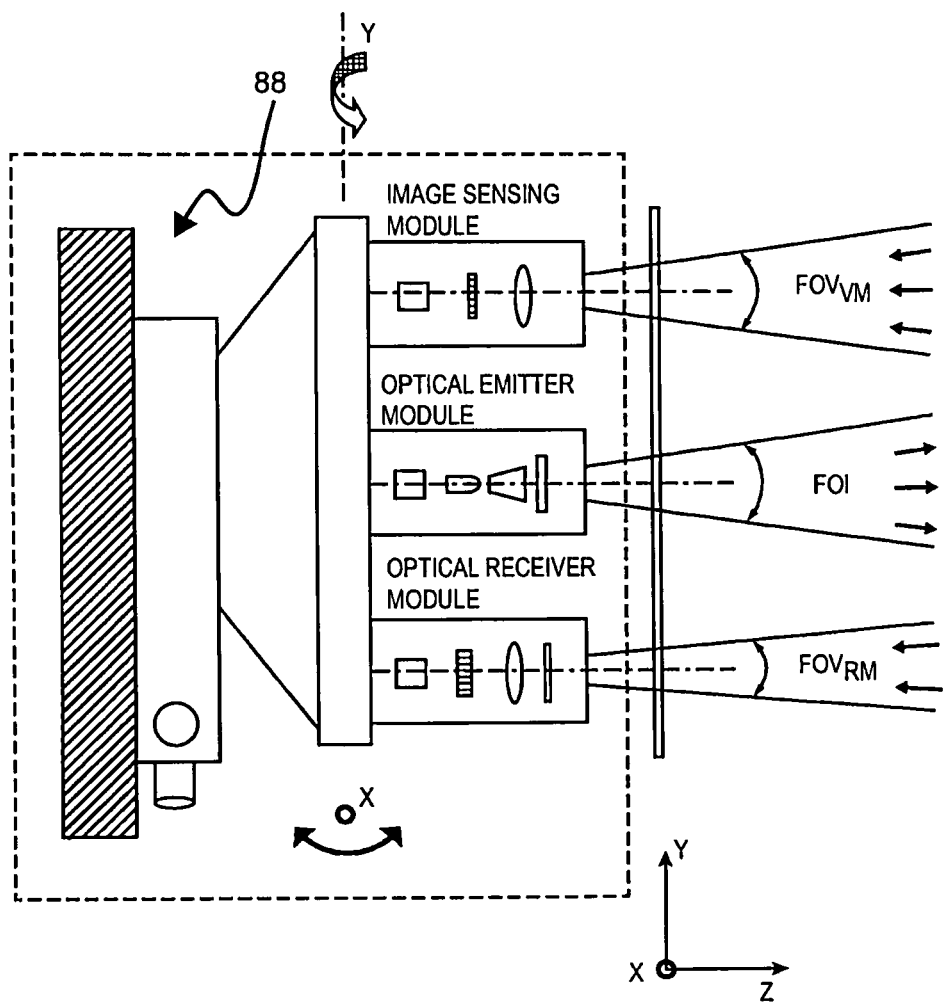
FIG. 8 is a schematic representation of an example optical unit of the traffic detection system, showing its main components.

The schematic diagram shown in FIG. 8 provides more details on the main components of the modules and actuator assembly that form part of the optical unit. As mentioned earlier, the ISM, OEM and ORM are secured to the pivotable attachment surface of an actuator assembly 88, whose actuation is under the control of an operator to perform the fine pointing of the common line of sight (also referred to as the optical axis) of the traffic detection system. In the figure, the optical axis of the system is made parallel to the Z axis of the Cartesian XYZ reference frame also depicted in the figure. FIG. 8 also shows that each individual module has a respective optical axis. The optical axes of the individual modules can be made parallel to each other (relative optical alignment) by using suitable hardware not shown in FIG. 8. This operation is to ensure that the center of the field of illumination of the OEM will be nearly coincident with the centers of the fields of view of the two other modules, as it is the case in the schematic diagram of FIG. 1. Fortunately, the tolerances on the relative optical alignment are relatively loose because of the wide (i.e., several degrees) field of illumination and fields of view of the three modules. This means that this alignment can be realized simply by properly machining the parts that will serve for attachment of the modules to the contact surface of the actuator assembly or with simple mechanical adjustment.

One skilled in the art will recognize that mounting on the actuator assembly 88 all of the modules, assemblies and components shown in the schematic diagram of FIG. 6 may offer some particular advantages. This design choice can then promote a more compact, highly-integrated traffic detection system by allowing the system components and modules to be closely provided within a small volume while reducing the number of separate printed circuit boards and shortening the wired connections. The specific mounting configuration discussed at length in this specification is mainly for illustrative purpose.

In response to the commands sent by the operator during the fine pointing of the traffic detection system, the actuator assembly pivots the three modules around the orthogonal X and Y axes shown in FIG. 8. A total angular span on the order of ±15° along each axis is found to be sufficient in most cases since a crude pointing of the traffic detection system along the desired direction can be made during its installation on a traffic light mast arm. Likewise, the angular resolution and precision required for the actuator assembly are relatively modest, so that low-cost devices intended for various uses are often found to be quite satisfactory. For example, the actuator assembly 88 can be nicely embodied by mirror glass actuators intended for use in remotely-controlled side-view mirrors for car vehicles, which provide very low cost, rugged solutions for the actuator assembly.

The line of sight of the traffic detection system points substantially downwards. A manual tilt positioning stage can be included within the optical unit to enable a coarse pointing of the system when the configuration of the support structure to which to system will be attached does not allow the system to point downwards along the desired direction. This is particularly the case for traffic detection system units that are intended for origin equipment manufacturer integration in traffic light assemblies. The coarse manual alignment step can be performed by inserting a suitable tool into access openings machined in the enclosure of the traffic light assemblies to drive the adjustment screws of the tilt positioning stage. The three optical modules, the actuator assembly and the tilt positioning stage are all attached together to form a rigid assembly that is affixed to a mounting bracket that is an integral part of the frame of the traffic detection system. The mounting bracket can be advantageously manufactured to have a predetermined tilt angle relative to the vertical Y axis in such a way that the line of sight of the optical unit can point substantially downwards when the traffic light assembly is installed on a traffic light mast arm.

For traffic detection systems configured as stand-alone units, the use of the manual tilt positioning stage discussed in the preceding paragraph can be prevented, for example, when the mounting bracket that secures the unit to the traffic light mast arm provides some degrees of freedom for pivoting the unit.

In one embodiment of the system, the actuator assembly 88 includes means for providing a feedback voltage signal to the control and processing unit about the current angular position of its pivotable attachment surface. The angular position feedback signal can be generated for example with calibrated potentiometer devices or encoders. Upon reception of the feedback signal from the actuator assembly, the control and processing unit is able to detect any accidental change in the current angular orientation of the optical unit. The unit can then warn the traffic controller that the optical alignment of a traffic detection system needs to be refined. Events like a sudden impact or shock on the enclosure of a traffic detection system or strong winds can cause its misalignment. As noted earlier, the misalignment of the system can also be detected by an inclinometer/compass unit. The misalignment can also be detected from the images send by the image sensing module as well.

2.A.1—The Optical Emitter Module

The optical emitter module (OEM) radiates brief pulses of light having a center wavelength in the near-infrared spectral region. Several factors favour the emission of near-infrared light, such as the availability of affordable compact optical sources and sensitive photodetectors, the very weak response of the unaided human eye in this spectral region, which makes the radiated light pulses undetectable (and then non distracting), and the weaker solar irradiance background level in this spectral region, as compared to visible light. Light in the ultraviolet (UV) spectral region would also be appropriate for the intended application, although the availability of convenient and affordable optical sources emitting in the UV is currently more problematic. The choice of light in the near-infrared spectral region should be thought of as an example, and not as a limitation.

Operating at a light wavelength that corresponds to a lower solar irradiance level promotes higher signal-to-noise ratios (SNR) for the useful signal echoes contained within the voltage signal waveforms. In an embodiment, at least one high-power light-emitting diode (LED) serves as the optical source in the OEM. LED devices share several desirable features of semiconductor laser diodes emitting in the same spectral region since they are very compact, rugged, solid-state optical sources that can be driven with very brief current pulses (with durations as low as a few nanoseconds) at high repetition rate. This latter capability is very useful for a system performing optical ranging based on the time of flight (TOF) principle. High-power LEDs are currently available for emission at a variety of wavelengths in the near-infrared spectral region. Longer near-infrared wavelengths such as 940 nm for example allow for the steady decrease of the solar irradiance background level with increasing wavelength in this region. As compared to laser diode sources, LEDs emit over a wider spectral band, which typically attains 10 to 50 nm, depending on the specific LED material and drive level. These spectral bandwidths are however narrow enough to enable efficient rejection of the solar irradiance background light through the use of a narrowband optical filter mounted in the ORM without sacrificing too much the amplitude of the detected signal echoes. Although LED sources are currently viewed as the best candidates for use in the traffic detection system, other light emitting sources could be envisioned, for example some types of laser sources. Furthermore, the traffic detection system could also make use of sources that emit electromagnetic radiation that does not fall within the optical spectral region. Radar devices are examples of such sources.

It is well known that the non-lasing emission of LED sources has much lower temporal and spatial coherence than the light emitted by laser diode sources, so that the light emitted by a LED source that impinges on the unprotected eye of an individual will spread over a much larger surface on the eye retina. As a result, for comparable optical power levels and wavelengths, LED sources provide much greater safety than is laser radiation for inadvertent ocular exposure. In fact, the potential ocular hazards that could result from exposure to the light emitted by LED devices are best assessed by performing hazard analyses based upon the rules and procedures defined in safety standards applicable for lamp devices, such as the International Standard IEC 62471 *Photobiological safety of lamps and lamp systems*, First Edition, (2006-07), published by the International Electrotechnical Commission.

As mentioned earlier, an efficient use of the light emitted from the OEM commands that the outer limits of its field of illumination do not significantly exceed the overall detection zone required for the approach that is covered by the traffic detection system. This condition prevails for the various outlines depicted in FIG. 1. The dimensions of the FOI are typically in the range of 15° to 50° along the horizontal direction and 2° to 10° along the vertical direction (assuming for simplicity that the system points horizontally). These dimensions depend on the height at which the system will be installed on the traffic light mast arm as well as on its horizontal distance from the stop-bar line of the approach. The raw near-infrared light output of a LED source can be optically conditioned for emission over the desired two-dimensional angular extent of the FOI by using a collimating lens assembly followed by an optical diffuser. The collimating lens assembly has a high input numerical aperture to collect the highly-diverging raw output light beam emitted from the LED. The lens assembly then redirects the light to form in its exit aperture plane a light irradiance distribution having a transverse cross-section suited to the dimensions of the optical diffuser, with a divergence angle reduced to typically a few degrees to allow the specified diffusing characteristics of the diffuser to be met. Upon its transmission through the optical diffuser, the light beam is converted into a generally asymmetric light cone whose opening (divergence) angles define the FOI of the OEM. In the present application optical diffusers of the holographic type have some advantages over others since their optical transmissions can reach 90% and even higher at the desired wavelength. Holographic light-shaping diffusers can be designed to spread the incoming light over a prescribed (asymmetric) FOI, which should have divergence angles that differ appreciably along both orthogonal X and Y axes for best use in the traffic detection system. This type of optical diffusers is also appreciated for its nearly Gaussian-shaped smooth output light irradiance distribution.

A lenticular lens is also very efficient to distribute light and also fulfills the needs in terms of FOI.

The OEM also includes dedicated electronics for driving the LED source with current pulses having peak amplitude and duration suitable for effective implementation of the optical ranging principle on which the operation of the traffic detection system is based. A pulsed voltage trig signal forwarded by the control and processing unit commands the generation of each current pulse by the drive electronics. The operating conditions and performance requirements for the traffic detection system call for the emission of short optical pulses having a duration typically in the range of 10 to 50 ns. Depending on the repetition rate at which the pulses are emitted, the duty cycle (relative ON time) of the optical emission can be as low as 0.1%. Driving a LED source at a low duty cycle allows for raising the peak current drive level at values that largely exceed the nominal current rating of the LED without significantly degrading its lifetime. In order to get the desired peak optical output power for the radiated light pulses, any lowering of the peak drive level of the LEDs can be compensated by mounting additional LED sources in the OEM and appropriately duplicating their drive electronics.

The traffic detection system may further benefit from the use of several LED sources by performing individual alignment (optical boresighting) of each LED source along a specific direction so that the collective overlap of the set of radiated light beams results in a best filled FOI. This strategy may provide a uniform FOI having the desired overall dimensions while not requiring the use of any optical diffuser.

2.A.2—The Optical Receiver Module

The temporal voltage waveforms processed by the control and processing unit for the identification of vehicles in the detection zone are generated by the optical receiver module (ORM) upon the capture of a part of the radiated light pulses that has been reflected or scattered over a solid angle defined by the collection aperture of the ORM. In the traffic detection system, the heart of the ORM consists in a plurality of photodetector devices having identical characteristics and mounted in the form of a linear (array) or a two-dimensional (mosaic) configuration. However, other configurations for the photodetectors can be envisioned. Each individual photodetector forms the optical front end of a detection channel connected to the control and processing unit. The unit then processes, in parallel, a plurality of temporal voltage waveforms that it receives nearly all at the same time after a brief delay of a few ns after it commanded the OEM to emit an optical pulse. In an embodiment, the photodetector configuration takes the form of a linear array of 16 identical photodiodes, avalanche photodiodes (APD) for example, made up of a semiconductor material that provides optimum sensitivity over a spectral band that encompasses the emission wavelength of the OEM. Silicon-based APDs can be selected for the detection of optical pulses at the 940-nm wavelength. The photodetection is not limited to the use of APDs since other popular types of fast and sensitive photodetectors like PIN photodiodes and photomultiplier tubes (PMTs) can be envisioned.

The linear array of photodetectors extends substantially along a direction that corresponds to the horizontal X axis when the traffic detection system is correctly mounted on a traffic light mast arm. This allows the longest dimension of the asymmetric field of view ($FOV_{RM}$) of the ORM to be disposed parallel to the width of the road approach that is monitored by the traffic detection system. Each individual photodetector of the linear array has its own field of view having an angular range given by the ratio of the dimensions of the sensitive surface area of the photodetector with the effective focal length of the objective lens assembly placed at some distance in front of the photodetectors. The typical characteristics of the linear array of photodetectors make the individual fields of view of the optical detection channels identical to each other, while being contiguous, unless some optically-blind zones exist between adjacent photodetectors in the array.

A high pass optical filter or narrowband optical filter tuned on the center emission wavelength of the OEM can be inserted in the objective lens assembly for optical rejection of the portion of the spectrum of the solar irradiance background and of to any parasitic artificial light (e.g., light from the vehicle headlamps) that falls out of the spectral emission bandwidth of the OEM. Optical interference filters can be used due to their spectral bandpass having steep edges and higher optical transmission. Optical filter reduce the potential saturation of the photodiode caused by ambient light and decrease the noise caused by external sources. Optical filter can also be integrated in the window of the photodiode. The window of the enclosure can also be used as an optical filter.

The ORM includes electronics for conditioning and converting the raw voltage signals at the output of the front end analog circuit of each photodetector of the linear photodetector array. As it will be apparent to those skilled in the art, conditioning electronics suited for use with photodiodes may include, in the case of APDs, high-voltage sources for polarizing the APDs, trans-impedance amplifiers, high-bandwidth amplifier stages, and analog-to-digital converters (ADC), so that the output voltage waveforms can be sent to the control and processing unit in the form of time-series numerical data streams. ADCs capable of converting data at rates of several tens and even hundreds of MegaSamples per second for each optical detection channel can be used to provide adequate distance resolution that will avoid any wash out of useful but narrow signal echoes that could be present in the temporal waveforms.

2.A.3—The image sensing module

The image sensing module (ISM) which also forms part of the optical unit finds its primary use during the fine pointing stage of the line of sight of the traffic detection system by providing to the operator images of the area currently covered by the system. This means that this module may be not activated during normal operation of the traffic detection system. The ISM then includes a low-cost, relatively low-resolution, image sensor such as a complementary-metal-oxide-silicon (CMOS) sensor, but other types of sensors can be envisioned. A dedicated electronic circuit converts in a suitable format the signals generated by the image sensor and then forwards the resulting image data to the control and processing unit. The objective lens of the ISM is selected to provide the desired field of view along with a convenient depth of field. In an embodiment, no artificial lighting source is provided with the ISM since the fine pointing of the traffic detection system is typically performed during daytime.

Besides their use for the fine pointing of the line of sight of the traffic detection system, the images generated by the ISM may found various applications and they can be processed in an endless variety of manners. For example, they can be combined with optical ranging data generated by the traffic detection system for implementing various types of image fusion schemes. Video content analysis can detect, recognize and analyse objects and events using digitized video streams from the image sensor and can be used to add advanced detection function. Specific virtual loops based on video content analysis can be set using the same interface. FIG. 9A shows an example of detection zone 90 defined by the system or by the user. The zone is split in several sub-zones (virtual loops). FIG. 9B shows a first vehicle 92 in an area 94 covered by the 3D sensor and the image sensor and a second vehicle 96 farther away which is detected by the video detection only (example of advanced detection or queue line detection). Sub-zones 91, 93 and 95 of detection zone 90 are highlighted. Typically, a virtual loop based on 3D sensor detection is more robust but video detection has a farther FOV. Use of both technologies in the same traffic detector permits to optimise the strengths of each technology. Likewise, the images can be transmitted to an external system or network to allow a remote operator to monitor the traffic at the intersection. Video compression (ex.: H.264) can be done by a processor to limit the bandwidth required for the video transmission. In addition to providing images, the ISM can also be used for measuring the ambient light background level to help in optimizing the control and operation of the photodetector integrated in the ORM. The image sensor sensibility can also be adjusted automatically (AGC) by the processor.

The enclosure of the traffic detection system comprises a flat protective window 84 of suitable dimensions that protects the various modules of the optical unit against incidental impacts of objects, dirt, and adverse weather conditions while allowing the 940-nm near-infrared light (when this wavelength is chosen for the emission) to be transmitted with minimum optical losses. For this purpose, anti-reflection coatings tuned at the emission wavelength can be deposited on both faces of the protective window. The optical transmission of the window in the visible and infrared portions of the spectrum should be sufficient for correct operation of the ISM. The exterior surface of the protective window may also be coated with a hydrophilic film that to reduces the optical distortions from rain droplets in contact with the surface.

3—Methods for Remote Alignment of the Line of Sight of the Traffic Detection System A method that allows a rapid and simple fine alignment step for the line of sight of the traffic detection system after it has been set in place is provided. The method does not require any physical contact with the system. The method relies on the images generated by the image sensing module (ISM) integrated in the optical unit of the system. Communication is established between the traffic detection system and a remote PC computer. The communication link can be direct or through a traffic controller interface card, a wireless data link using the remote access point. The PC computer could be a portable laptop PC computer used by an operator located in a safe and comfortable location in close proximity of the road intersection, without causing any disturbance of the traffic flow such as lane closures. Images are received from the ISM, showing the area of the approach that is currently covered by the traffic detection system. The outline of the overall detection zone of the system can be displayed on the images in overlay (similarly to FIG. 2 A, allowing the operator to quickly determine the need for some fine tuning of the line of sight of the system. The operator sends commands to the traffic detection system to remotely actuate the motorized actuator assembly that will controllably pivot the whole optical unit of the system. The current pointing of the optical unit can then be fine tuned until the overall detection zone seen in overlay covers the desired portion of the road intersection to be monitored by the traffic detection system.

Some specific reference points, or markers, can be identified in the images by the operator and their locations in the images stored in a repository or database, for later use. This is to enable the control and processing unit of the traffic detection system to monitor on a continuous basis the current alignment of the optical unit for quick detection of any misalignment that persists with time. It would also allow the traffic detection system to trigger to the traffic controller a signal indicative of a temporary faulty operation of the system. A faulty operation may be caused for example by strong winds that swing the traffic light mast arm in a such a way that the line of sight of the traffic detection system is swept erratically over a large angular span. Additionally, the reference points in the images may serve for estimating the mean amplitude level of the vibrations to which the traffic detection system can be submitted at any moment. For this purpose, the images can be processed for detection and measurement of any rapid time variation of the precise locations (in terms of pixels) of the references points within the images.

The angular coverage of the actuator assembly should encompass the zone of interest, and the system should determine the optical detection channels that should be considered. Likewise, the system should determine both minimum and maximum detection distances in each selected detection channel in order to simulate one or several virtual loops.

The three methods to be described all include the installation of the traffic detection system followed by a rough alignment of its line of sight along the zone of interest. The precision of this preliminary alignment step during system installation should be within what the actuator assembly can actually provide.

Using a configuration software running on a PC computer, the operator connects to the traffic detection system. He gains access to relatively low-resolution images sent on a continuous basis.

Method 1: Based on the Measurement of the Width of the Lane

The operator selects the configuration mode of the software. He then gets an image having typically a higher resolution. The operator draws the outlines of the lanes. This process can be either partially automated (the operator indicates where the stop-bar line is located) or fully automated (the system recognizes the stop-bar line from the image). When needed, the operator validates the information provided by the system. He can also indicate that he wants to detect vehicles located farther than the stop-bar line. The operator should enter the width of one or of several lanes in order to solve the three-dimensional ambiguity. Instead of the width of a lane, the operator may provide the distance of the stop-bar line if it is known, although this distance is more difficult to measure in a correct manner. The comment also holds for the height of the system. This information can be obtained from a drawing, by measurement, or from any other estimate that is judged precise enough.

From the knowledge of the locations of the optical detection channels and of the lanes as well as from the properties of the ISM, the computer commands the system to move the actuator assembly towards the appropriate orientation. Once this setting is completed, a new image is acquired and the computer attempts at recovering the locations of the lanes in the image, using greyscale correlation, and it prompts the operator to confirm that the locations are correct or if some further refinement is required. The execution of some of these steps may need to be repeated. At this stage, the geometrical configuration of the road intersection is known. The minimum and maximum detection distances can be automatically set, for instance to locate the virtual loop at a predetermined distance from the stop-bar line or according to any distance specified by the operator.

Method 2: Based on Images Showing a Vehicle that Gets Closer to the Stop-Bar Line The operator selects the configuration mode of the software. He then gets an image having typically a higher resolution. The operator indicates the position of the stop-bar line or, in a more complete manner, he draws the outlines of the lanes, including the stop-bar line. This step can be either partially automated (the operator indicates where the stop-bar line is located) or fully automated (the system recognizes the stop-bar line and the lanes) by computer-aided detection of straight lines in the images. When needed, the operator validates the information provided by the system. From the knowledge of the locations of the optical detection channels and of the lanes as well as from the properties of the ISM, the computer commands the system to move the actuator assembly towards the appropriate orientation. Once this setting is completed, a new image is acquired and the computer tries to recover the locations of the lanes in the image, using grey-scale correlation, and it prompts the operator to confirm that the locations are correct or if some further refinement is required.

When the system detects the presence of an object moving in the proper direction, i.e., towards the stop-bar line, it transmits a sequence of images while keeping into memory the measured distance of the vehicle for each image in the sequence. The operator then determines the image that shows the vehicle at the distance that is desired for locating a virtual loop. Several image sequences may be needed to perform this step. Once the distance is selected, the operator then determines the location of the virtual loop for each lane to be monitored. The virtual loops for a set of adjacent lanes are usually located at the same distance, although the operator may wish to offset this distance as compared to the distance that was initially determined. The operator verifies that the traffic detection system operates correctly.

Method 3: Based on a View/Drawing of the Road Intersection

Figure 10:
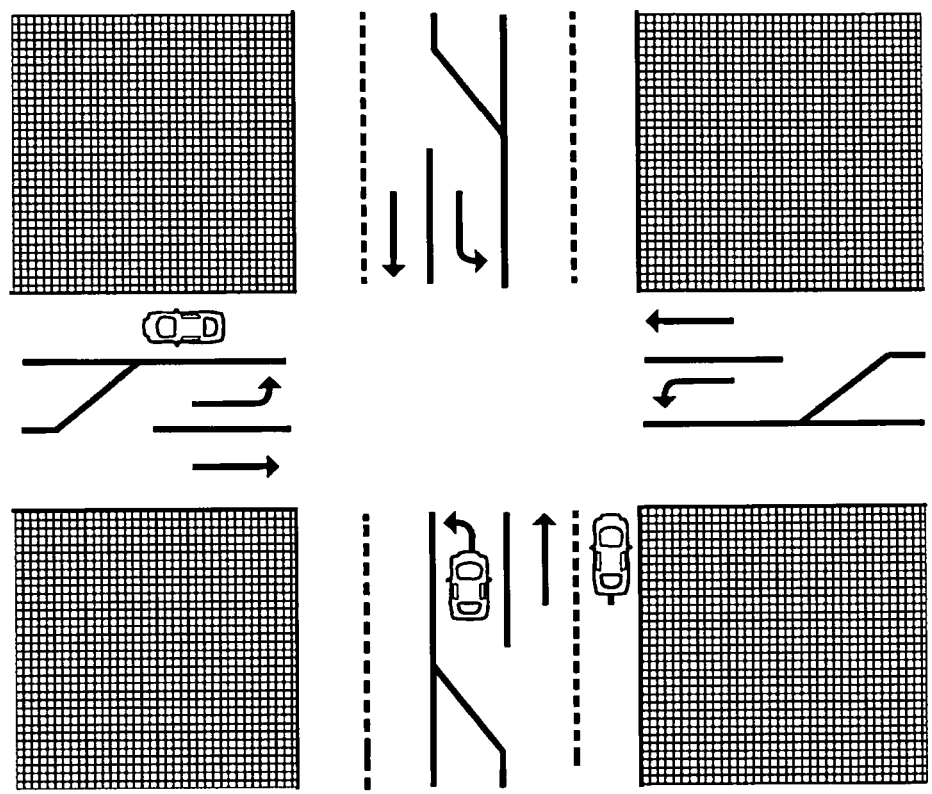
FIG. 10 shows an example of a top view of a road intersection.

An aerial view or a drawing of the intersection is stored into the computer's memory. An example of such aerial view is shown in FIG. 10. Using the view or the drawing, the operator identifies the position and height of the traffic detection system(s) as well as the desired locations of the virtual loops. He then evaluates the distance that separates each virtual loop from the traffic detection system that will cover the loop, using the scale of the view/drawing. The operator then selects the configuration mode of the software. He then gets an image having typically a higher resolution. The computer software corrects for the perspective between the top view of the intersection (provided by the aerial view or the drawing) and the images provided by the ISM of the traffic detection system. This correction is to establish the relationship between the locations of the virtual loops as selected by the operator in the view/drawing and the corresponding locations of these loops in the images from the ISM. The software then controls the actuator assembly for the alignment and determination of the detection zones as functions of the virtual loop locations defined by the operator.

4—Methods for Numerical Processing of the Captured Signal Waveforms

The system implements a processing of the signal waveforms generated by the plurality of optical detection channels. The primary objective of the waveform processing is to detect, within a prescribed minimum detection probability, the presence of vehicles in a lane that is mapped to a number of adjacent detection channels. Because of the typical optical reflection characteristics of the bodies of vehicles and of various constraints that limit the performances of the modules implemented in a traffic detection system, the optical return signals captured by the ORM are often plagued with an intense noise contribution that washes out faint signal echoes indicative of the presence of a vehicle. As a consequence, some first steps of the waveform processing are intended to enhance the signal-to-noise ratio (SNR) of the useful signal echoes. Such filtering steps may start by numerically correlating the raw waveforms with a replica of a strong, clean signal echo that was previously captured or artificially generated. The waveforms processed in this way then get a smoother shape since a significant part of the high-frequency noise initially present in the raw waveforms has been eliminated.

In a second step of the processing, the SNR of the useful signal echoes is present in the waveforms can be further enhanced by averaging a number of successively-acquired waveforms. The better SNRs obtained by standard signal averaging (accumulation) are possible provided that the noise contributions present in the successive waveforms are independent from each other and fully uncorrelated. When this condition is satisfied, which is often the case after proper elimination of the fixed pattern noise contributions, it can be shown that the SNR of the waveforms can be increased by a factor of $(N)^{1/2}$, where N is the number of averaged waveforms. Averaging 400 successive waveforms can then result in a twenty-fold SNR enhancement. Another condition that practically limits the number of waveforms to be averaged is the need for stationarity of the processes that generate the useful signal echoes. Stated otherwise, the properties (peak amplitude, shape, time/distance location) of the useful features present in the waveforms should remain ideally unchanged during the time period required to capture a complete set of waveforms that will be averaged. This condition may become particularly annoying when attempting to detect vehicles that move rapidly, this situation leading to signal echoes that drift more or less appreciably from waveform to waveform. Although this situation occurs frequently during typical use of the traffic detection system, its detrimental impacts can be alleviated by designing the traffic detection system so that it radiates light pulses at a high repetition rate (e.g., in the kHz range). Such high repetition rates will enable the capture of a very large number of waveforms during a time interval sufficiently short enough to keep stationary the optical echoes associated to a moving vehicle.

In one embodiment of the system, the waveform averaging is advantageously implemented in the form of mobile averaging, wherein the current average waveform is continuously updated by summing it with a newly-acquired waveform while rejecting from the average the waveform that was first acquired. Using a mobile average does not impact on the rate at which the output detection data is generated by the control and processing unit. Moreover, a timely detection of a vehicle that appears suddenly in a lane can be enabled by resetting the mobile average when a newly-acquired waveform presents at least one feature that differs appreciably from the current average waveform.

The detection of a vehicle in any given lane monitored by the traffic detection system relies on finding its signal echo in the detection channels to which the lane is mapped. To be considered as significant, the position of the signal echo in the processed waveforms should be farther than the position at which the detection zone starts (minimum detection distance), which usually corresponds to the stop-bar line of the monitored lane. Echoes that are found to be closer than the minimum detection distance are tagged as obstacles, and in this case no further detection is performed within the lane. The current position of the vehicle within the lane is inferred from the position of the significant signal echo in the waveforms. A more accurate positioning of a signal echo is obtained by performing a local second-order (parabolic) interpolation around the peak position of the signal echo. In practice, only signal echoes within minimum and maximum distance range of the virtual loop will be retained for triggering of an output detection signal.

A simple state machine programmed in the control and processing unit can determine the real significance of a signal echo from an analysis of the time history of the waveform signal amplitude in the vicinity of a suspected echo. Hence, the progressive increase of the signal amplitude above a configurable threshold amplitude would trig a transition of the state machine, indicating the detection of a vehicle.

Figure 11:
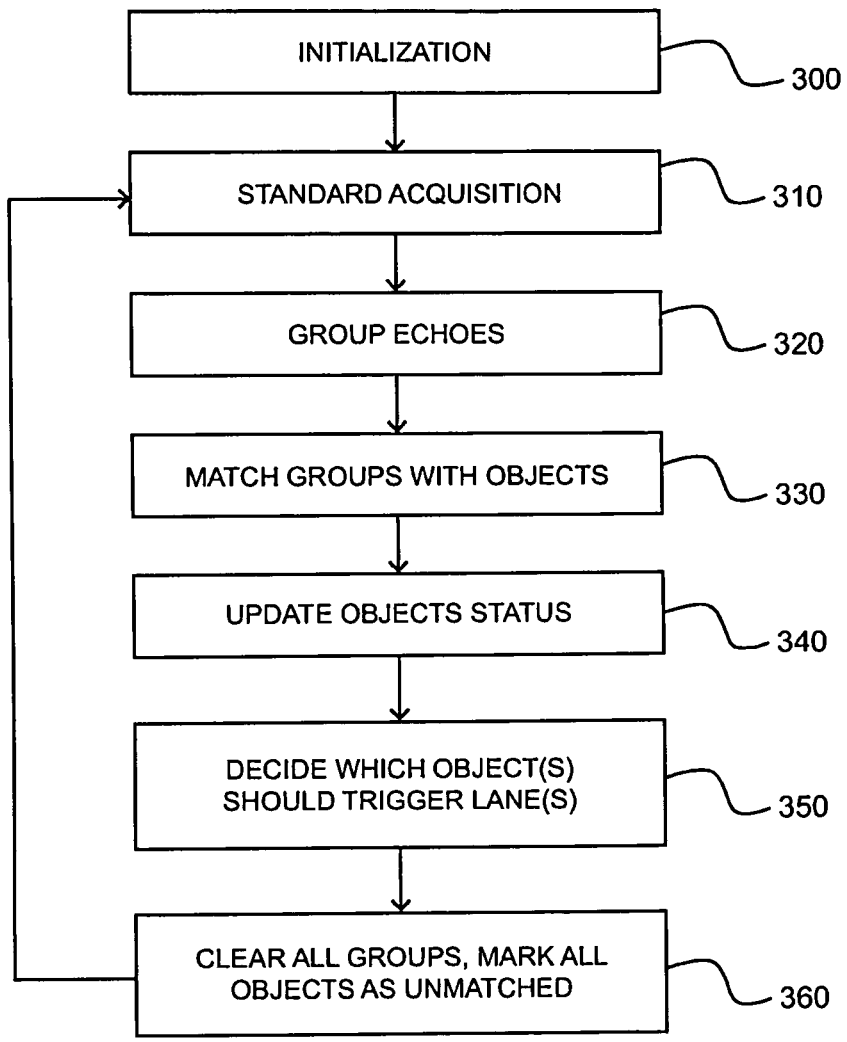
FIG. 11 is a flowchart diagram which summarizes the main steps of an example process by which the signal echoes detected in the waveforms provided by the set of detection channels are converted into output detection signals.

The process by which the signal echoes detected in the waveforms provided by the set of detection channels are converted into output detection signals (also referred to as virtual loop triggers) is detailed in the general flowchart diagram shown in FIG. 11. Once the traffic detection system has been properly initialized in step 300 of the flowchart, optical signal waveforms are acquired by the optical receiver module, which then converts them into electrical signal waveforms. The latter are then forwarded to the control and processing unit for further processing. The standard acquisition step 310 in the flowchart then includes the capture of the waveforms followed by some pre-processing steps such as filtering, averaging, and detection of significant signal echoes. All of these pre-processing steps have been described in the preceding paragraphs. Compatible echoes are grouped together in step 320. A group is defined as a set of signal echoes detected in different channels and that are located at nearly the same distance from the system, i.e., their distances differ by typically less than 50 cm from each other. The echoes should be found in adjacent channels to be grouped together, is although, in some cases, a single channel with no echo is allowed to account for possible weak reflection signals having peak amplitude somewhat below the detection threshold.

In step 330, the various groups that have been formed are matched with existing objects. During each iteration of the process, an existing object may have its properties updated by a group. Furthermore, a group that cannot be matched to a group formed in a previous iteration (which is now an object) becomes a new object. For each iteration, the position of an object in the next iteration is predicted, unless the current object is a new object. The predicted position is given by the sum of the current position of the object with the difference between the positions found in the two preceding iterations, assuming that the object existed during these iterations. When all of the groups have been formed, all of the objects are then examined to find an object for which the predicted position matches the current position of a group. If the current position of a group does not match to any predicted position, a check is made to find a new object (without any prediction) whose position would match the position of a group, assuming that the object moves at a reasonable speed. If such objects are not found, a new object is created.

The status of each object is then updated in step 340 according to the findings from the previous step. A part of the update step consists in evaluating a predicted position of each object. In step 350, decisions are then taken about which objects should trigger a lane, while in step 360 the groups and objects are reset in such a way that all groups are cleared and all of the objects are tagged as unmatched. The processing then resumes by returning back to the standard acquisition step 310 to acquire a new set of signal waveforms.

The main processing steps 320 to 350 of the flowchart diagram of FIG. 11 are discussed in greater details in the following paragraphs, the discussions being supported by specific flowchart diagrams illustrated in FIGS. 12 to 15.

Figure 12:
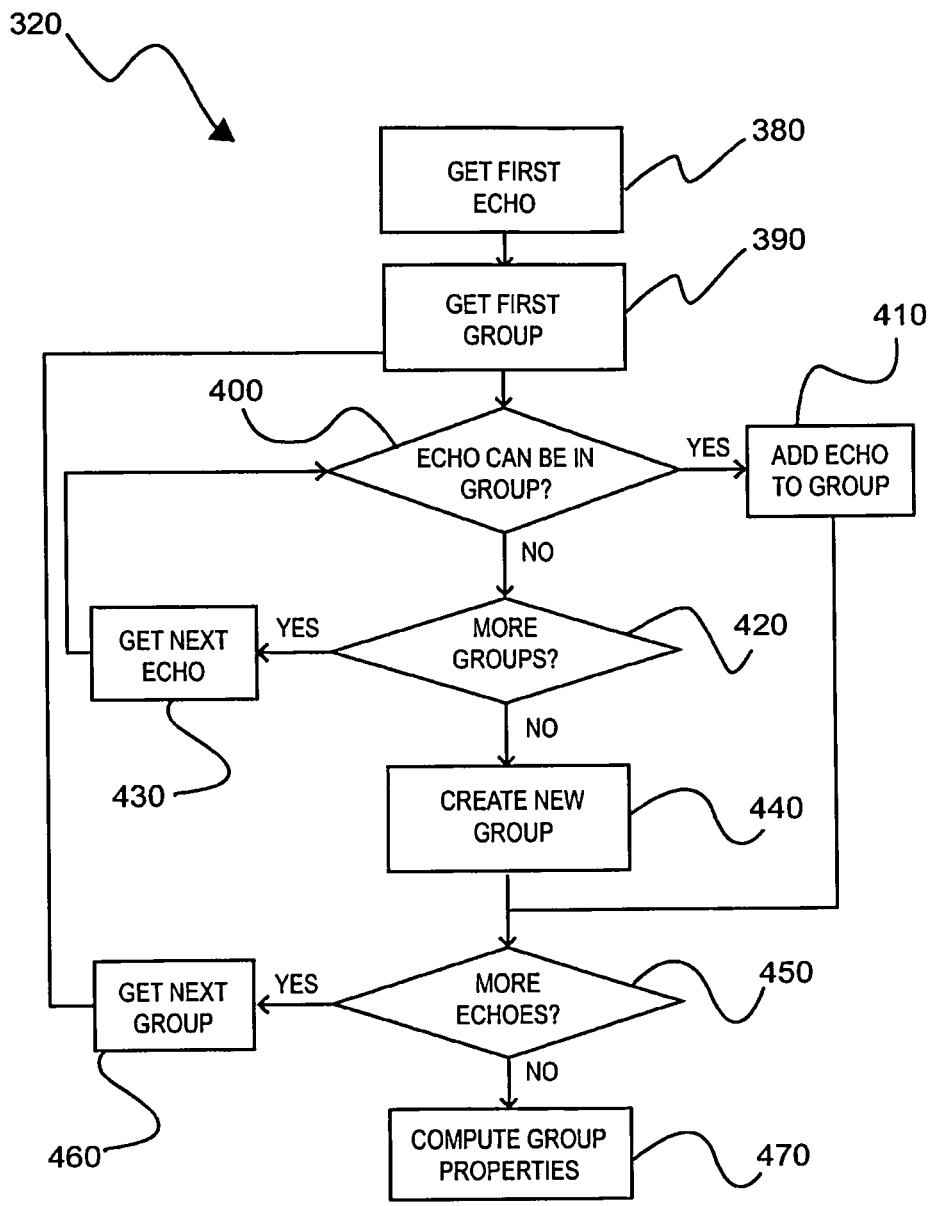
FIG. 12 is a flowchart diagram that details step 320 of FIG. 7.

FIG. 12 then depicts a flowchart diagram that further details the way the grouping of the echoes is carried out in step 320 of FIG. 11. Each time a new signal echo is available (step 380), its properties are first examined to determine if the echo could be joined to a group. If its properties match those of the first group (steps 390 and 400), the echo is joined to the group in step 410 and the process is then directed to step 450 to look for a new echo. The capture of a new echo is then performed in step 460 prior to returning back to step 390 to reset the comparison of the properties of the newly acquired echo with that of the first group. In the advent that the properties of the first echo did not match with that of the first group, it is determined if a second group is currently existing in step 420 and if it is the case, the properties of the second group are recovered in step 430 prior to returning back to step 400 to compare the echo properties with that of the second group. If it is determined that the echo cannot be joined to any group in step 420, a new group is then created in step 440. A new signal echo is then sought in step 450 and captured in step 460 to compare its properties with those of the first group in step 390. If no further echoes are available in step 450, some properties of the existing groups are then computed in step 470. The properties of a group consist primarily of the mean distance (location in the waveforms) of the echoes present in the group and the total intensity of the group. The mean distance is computed from the average of the distances associated to all of the echoes belonging to the same group. The intensity of a group is computed from the sum of the peak amplitude of the echoes, which gives an indication of the confidence level associated to a group. This means, for example, that a group comprising several faint echoes can be as reliable as a group made up of a single echo having strong peak amplitude.

Figure 13:
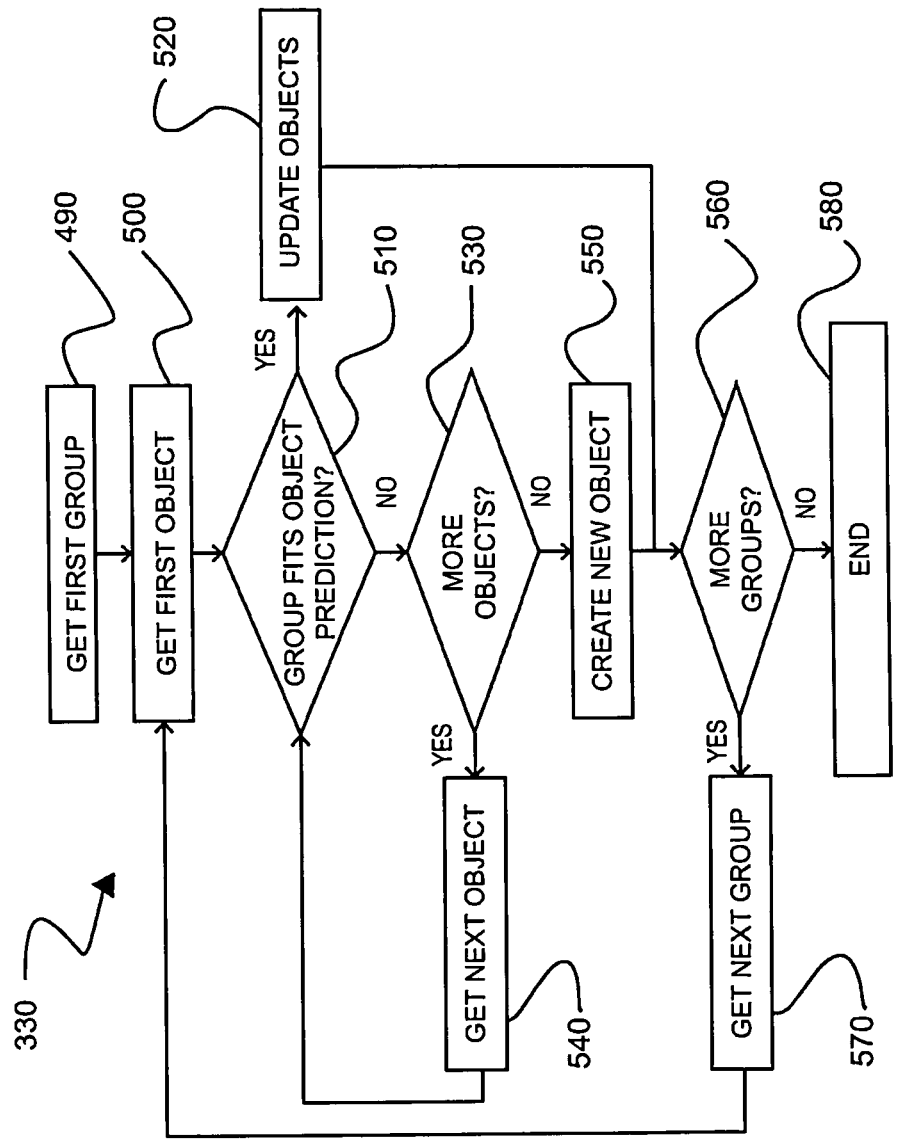
FIG. 13 is a flowchart diagram that details step 330 of FIG. 7.

The processing that is carried out during performance of step 330 (Match groups with objects) of FIG. 11 can be further detailed by referring to the flowchart diagram shown in FIG. 13. Step 330 of FIG. 11 then starts by recovering the properties of the first group and of the first object in steps 490 and 500, respectively. In step 510, the current group distance is compared to the predicted distance of the current object. If both distances are close enough or if the current object could be at the distance of the current group by assuming that it moves at a reasonable speed, then the current properties of the object are updated in step 520 before proceeding with step 560 to determine the existence of a second group. If a second group exists, its properties are recovered in step 570 prior to returning back to steps 500 and 510 to compare these properties with that of the first object. If no group can be matched with the first object, the processing then inquires for the existence of a second object in step 530. If a is second object exists, its properties are recovered in step 540 prior to returning back to step 510 to compare those properties with that of the first group. In the case where the properties of a group do not match with any of the currently existing objects, a new object is created in step 550. The properties of the next group are then recovered by performing steps 560 and 570, and the process returns back to step 500. The process finishes in step 580 when all of the currently existing groups have been processed.

Figure 14:
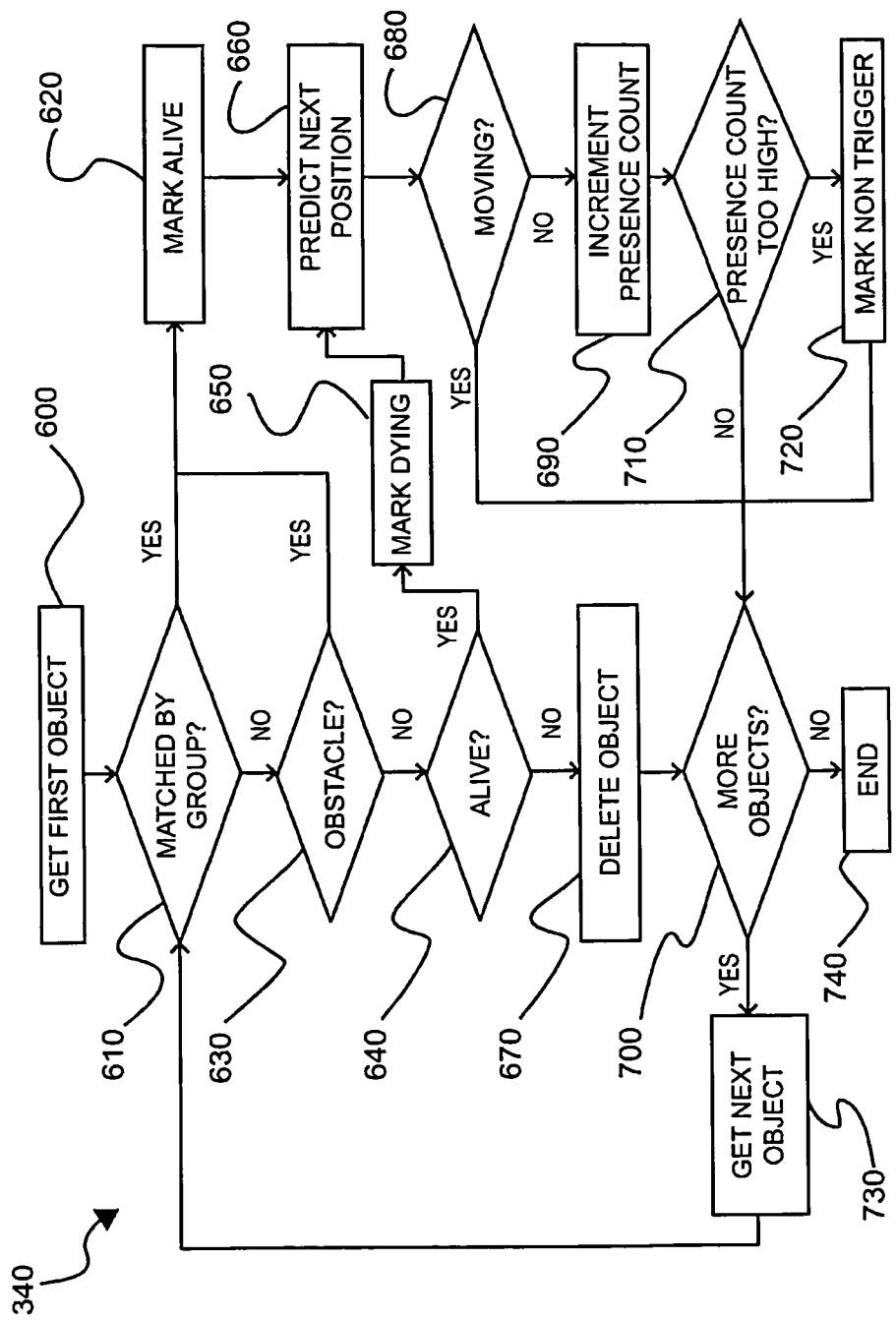
FIG. 14 is a flowchart diagram that details step 340 of FIG. 7.
Figure 15:
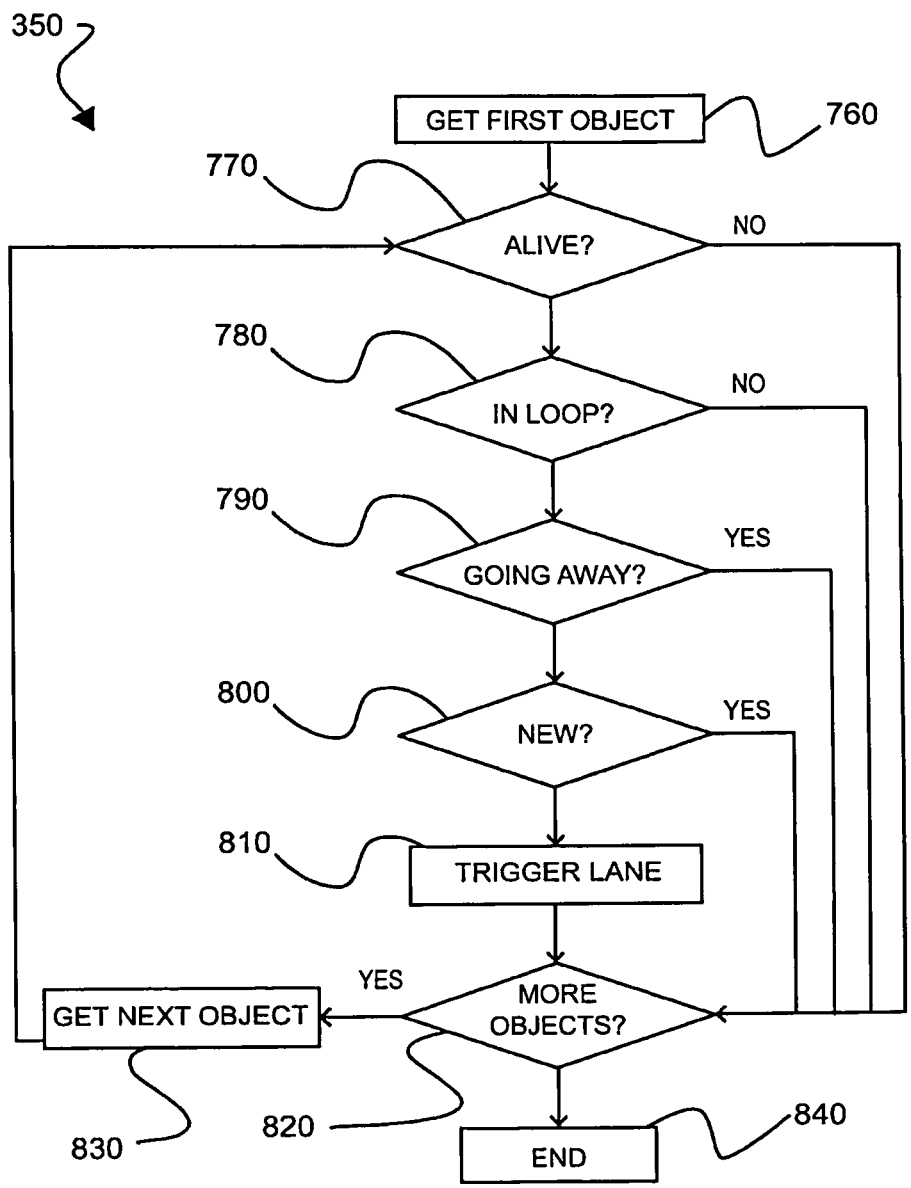
FIG. 15 is a flowchart diagram that details step 350 of FIG. 7.

The update of the status of each object performed in step 340 of the flowchart shown in FIG. 11 is illustrated in greater details in the flowchart diagram of FIG. 14. Once the properties of a first object have been recovered in step 600, it is tagged as ALIVE in step 620 if its properties were successfully matched to that of a group in step 610. If it was not possible to match the object to a group, a check is made to determine if the object could be an obstacle in step 630. If it is the case (i.e., its distance is lower than the minimum detection distance), the object is tagged as ALIVE in step 620. If the object is not an obstacle while it is currently tagged as ALIVE in step 640, then its tag is changed for DYING and a prediction of its next position (distance) is then performed in step 660. From the currently predicted position, if the object is found not to be moving in step 680, its presence count is incremented in step 690. In step 710, the presence count is then verified and if it exceeds a predetermined threshold the object is tagged in step 720 in such a way that it will not be allowed to trigger a lane. This event characterizes an abnormal situation like the presence of a stuck signal, a snow bank in the lane, the signal from the ground, or a stranded vehicle in the lane. The update then proceeds with steps 700 and 730 by recovering the properties of the next object and returning back to step 610. The update ends up in step 740 when all of the currently existing objects have been processed.

The last major processing step that forms part of the general flowchart diagram of FIG. 11 is step 350 in which a decision is made about which objects should trigger a lane. Once a first object has been recovered in step 760, its current tagging is verified in step 770. Because only objects tagged as ALIVE can trigger a lane, another object is immediately sought in step 820 and its properties recovered in step 830 if the current object is not tagged as ALIVE. For an object tagged as ALIVE, its current distance is checked in step 780 to make sure that it is located between the minimum detection distance and the maximum detection distance. Stated otherwise, the object should lie within an area of the lane that is monitored by a virtual loop. If the distance is correct, a further check is made in step 790 to determine if the object is approaching the intersection. Objects moving away from the intersection will not be allowed to trigger a lane. Another check is then made in step 800 for the number of iterations the object has been found to exist. Hence, the object will not be allowed to trigger a lane if its existence is currently limited to a single iteration. When all of the previous checks are found to be successful, the lane of the intersection that is currently mapped to the average detection channel in which the object was detected is triggered, i.e., a positive detection signal is generated for this lane. The process is repeated for all of the objects, and it ends up in step 840.

Figure 16:
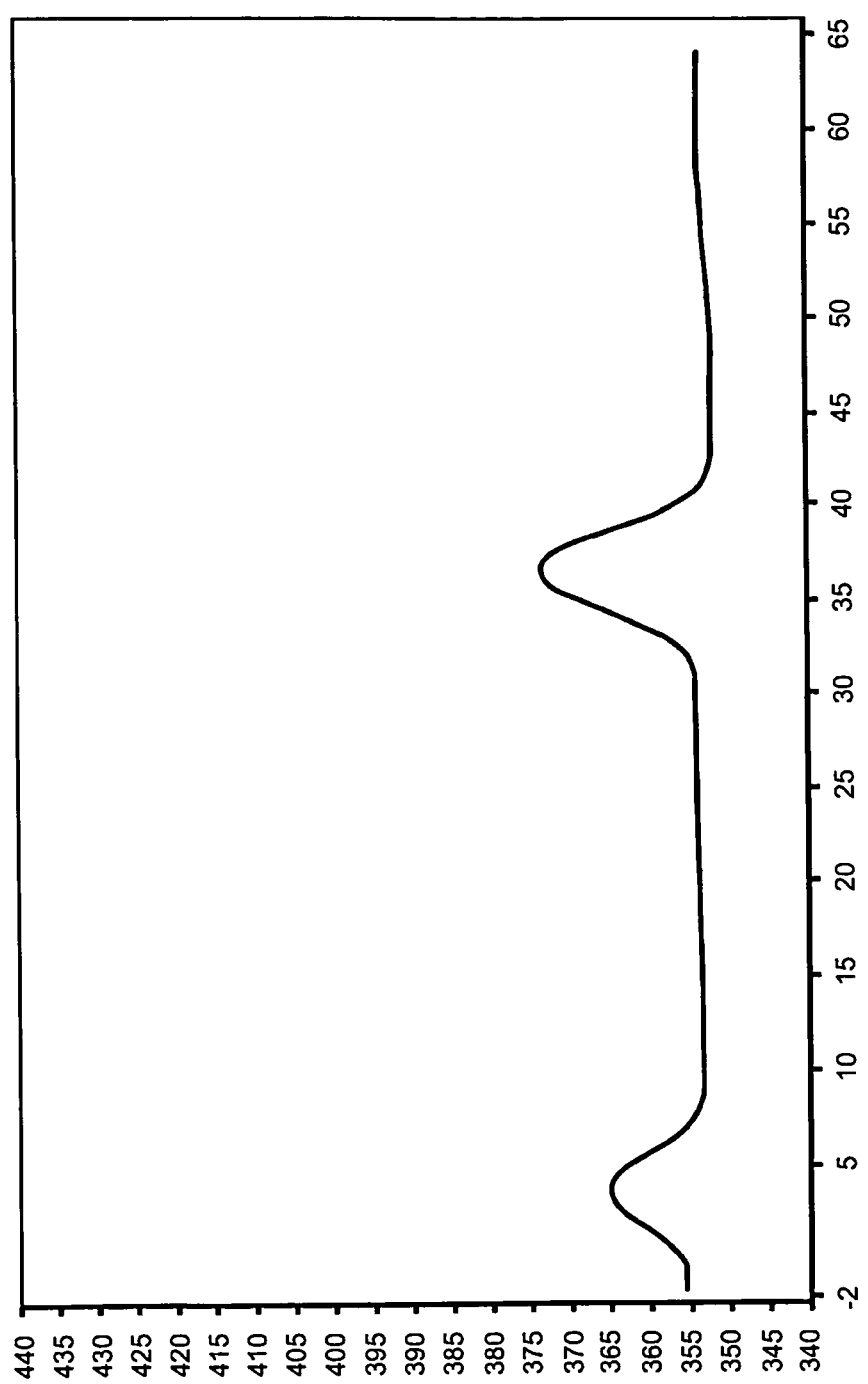
FIG. 16 shows an example signal waveform acquired by the traffic detection system.

FIG. 16 shows an example signal waveform acquired by a traffic detection system. The first pulse visible on the left-hand side of the waveform comes from the reflection of a radiated light pulse on the protective window that forms part of the system enclosure. This first pulse can be used for a calibration step of the system, which will enable absolute distance measurements. The center location of this pulse within the waveform may then be defined as the origin of the horizontal axis of the displayed waveforms, i.e., the location at which the distance is set equal to zero. If the system distance calibration has some drift, due to temperature changes for instance, it can be readjusted based on the position of this first pulse in the waveforms. The traffic detection system can also offer the possibility of providing weather information like the presence of fog or snowing conditions. Fog and snow have an impact on the reflection of the radiated light pulses off the protective window. In the presence of fog, the peak amplitude of the first pulse exhibits sizable time fluctuations, by a factor that may reach 2 to 3 when compared to its mean peak amplitude level. Likewise, the width of the first pulse also shows time fluctuations during these adverse weather conditions, but with a reduced factor, i.e., by about 10% to 50%. During snow falls, the peak amplitude of the first pulse visible in the waveforms typically shows faster time fluctuations while the fluctuations of the pulse width are less intense. Finally, it can be noted that a long-lasting change in the peak amplitude of the first pulse can be simply due to the presence of dirt or of snow deposited on the exterior surface of the protective window.

Figure 17:
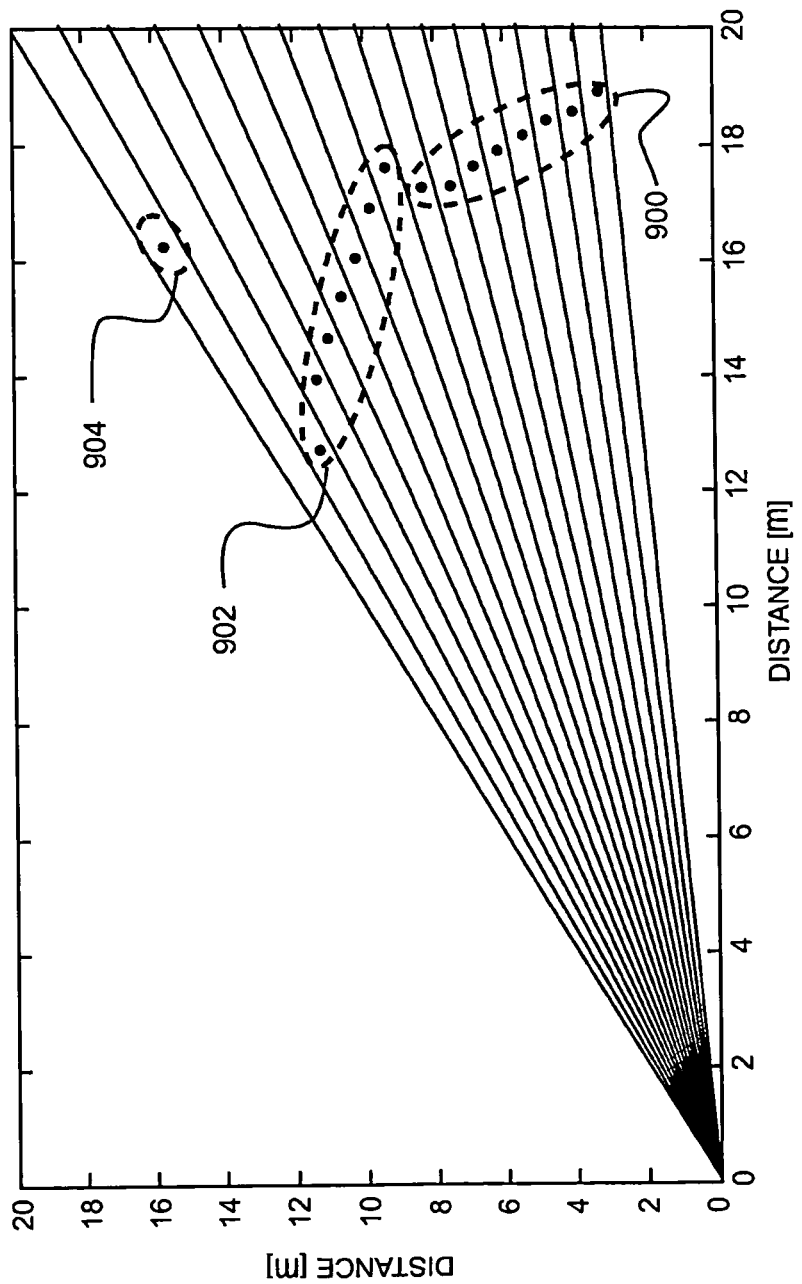
FIG. 17 shows an example measurement technique to measure the distance of some elements in the background like the pavement, a median strip and a tree.
Figure 18A:
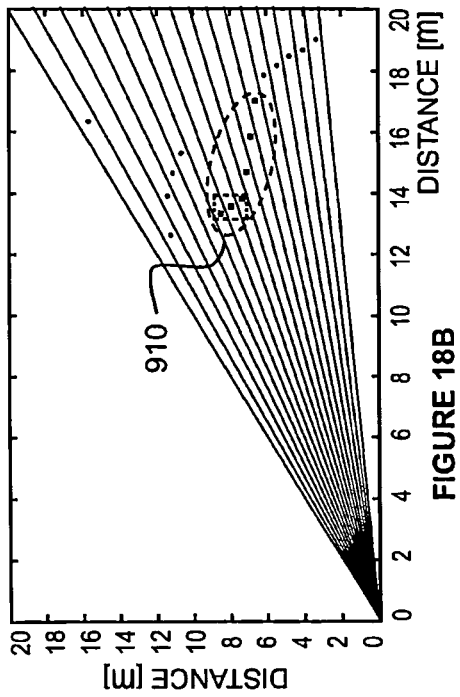
FIGS. 18A, 18B, 18C and 18D show an example sequence of a moving vehicle which is detected by the system.
Figure 18B:
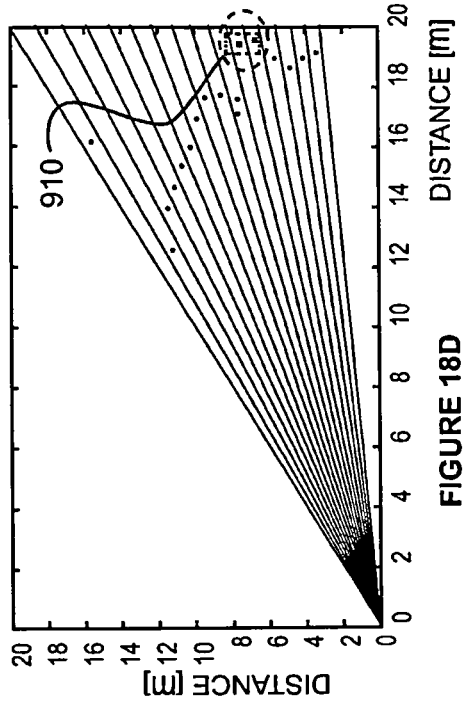
Figure 18C:
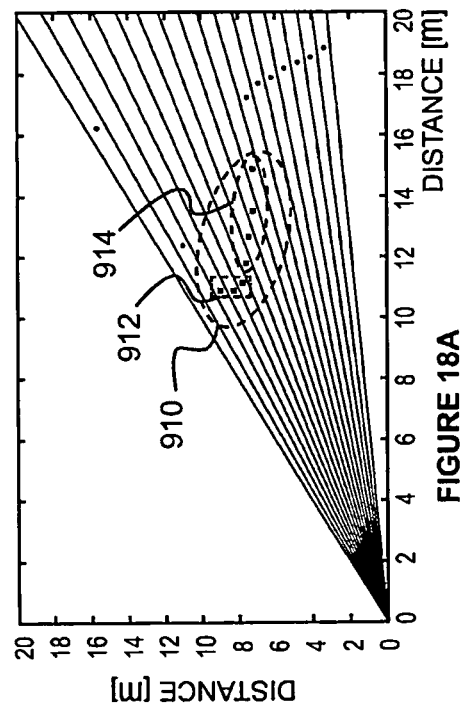
Figure 18D:
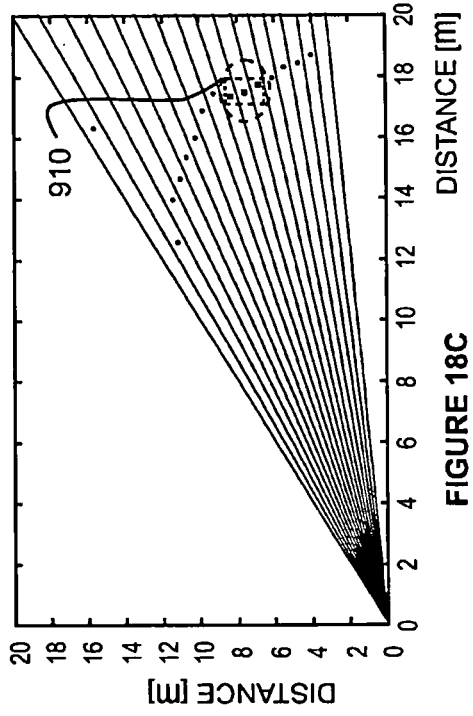

In general, the detection system has to deal with the fact that pavement, sidewalks, curbs, median strips and fixed objects like road signs send a reflection to the 3D sensor. FIG. 17 shows the measurement of the distance for the pavement 900, median strip 902 and a tree 904. In that example, the 3D sensor is positioned on the side of the road and detects vehicles going away. Echo back signals from the pavement are generally weak and noisy and can be discarded as background noise. However, this background can change in some circumstances such as when the ground becomes wet by rain, ice or snow. The echo back signal from the pavement can disappear or, in some cases, get stronger in terms of amplitude with a more precise and fixed distance (less noisy). The process tracks the evolution of the reflection of the pavement and masks this "object" to avoid generating false alarms (an adaptive mask as a function of amplitude and noise of the distance measurement). Fixed objects, like road signs in the field of view, can also generate an echo back signal but generally with a constant amplitude and constant distance measurement. Those objects have to be considered by the system as background features.

FIGS. 18 A, B, C and D show a sequence where a vehicle is detected before, at the same distance than and further than the distance of the pavement. FIG. 18 A shows the detection 910 of the vehicle. The signal is typically stronger (identified by square dots) and a segmentation can be done to detect the back 912 and the side 914 of the vehicle. FIG. 18 B shows the evolution of the movement of the vehicle 910. FIG. 18 C shows the vehicle 910 reaching the same distance than the pavement and FIG. 18 D shows the vehicle 910 going further than the distance to the pavement. This sequence is an example of how the 3d sensor using several FOVs and a complete echo back digital signal waveform can track an object based on information such as the amplitude of the signal, distance measurement, segmentation and movement.

The invention claimed is:

1. A method for detecting the presence of an object in a detection zone using a traffic detection system, wherein said object is one of a moving object and a stationary object, the method comprising:
   providing said traffic detection system including an optical unit having
      an optical emitter module emitting short light pulses within a predetermined field of emission, said field of emission being a field of illumination;
      an optical receiver module receiving a part of the light pulses reflected by an object in said field of emission toward a field of view of said receiver module said field of view including a plurality of adjacent detection channels, said receiver module acquiring for a period of time after the emission of said pulses and converting said received light pulses into a corresponding plurality of a digital signal waveforms, and
      an image sensing module providing an image that encompasses the field of emission of the emitter module and the field of view of the receiver module;
   providing a status overlay image for said field of view including said image and a visual indication on said image of an outline of said plurality of adjacent detection channels;
   positioning the field of view of said receiver module to cover said detection zone using said status overlay image;

obtaining said plurality of digital signal waveforms using said traffic detection system;

detecting a signal echo in one of said digital signal waveforms at a position within said field of view, said signal echo being caused by said presence of said object in said field of view;

determining a location in said field of view for said object using said position including calculating a time taken by the emitted pulses to travel from the optical unit to the object and return back to the optical unit;

storing said location for said object, and sending said stored location to an external processor.

2. The method as claimed in claim 1, wherein said detection zone is defined along a stop bar of an approach of a road intersection.

3. The method as claimed in claim 2, further comprising applying image processing on said image to detect candidate objects, extracting a position of said candidate objects in said field of view from said image, using said extracted position to generate said call.

4. The method as claimed in claim 1, further comprising:
identifying which detection channel produced said signal waveform in which said signal echo is detected;
using said status overlay image, determining a traffic lane corresponding to said identified detection channel;
detecting the presence of the object in the determined traffic lane.

5. The method as claimed in claim 4 further comprising:
providing a minimum and a maximum detection distances from said optical unit within said field of view for said detection channels;
generating a call if said signal echo is within said minimum and maximum detection distances for said determined traffic lane;
sending said call to a traffic controller.

6. The method as claimed in claim 5, further comprising detecting a signal echo in the signal waveform at a position closer to the optical unit than the minimum detection distance and holding said call.

7. The method as claimed in claim 1, further comprising providing a threshold amplitude for the echo, said detecting a signal echo comprises comparing an amplitude of the signal echo to the threshold amplitude, said threshold amplitude being one of an amplitude absolute value and an amplitude relative value varying as a function of said position.

8. The method as claimed in claim 1, further comprising determining an amplitude of the signal echo, grouping compatible echoes based on echo properties in an echo group, said echo group being a set of signal echoes in different channels, the echo properties being at least one of said location being substantially the same, said amplitude being substantially the same and an overall group location of said echo group including said location.

9. The method as claimed in claim 8, further comprising matching the group to an object type.

10. The method as claimed in claim 1, wherein said optical emitter module emits short pulses of light at a wavelength invisible to the human eye.

11. The method as claimed in claim 1, wherein said traffic detection system further includes a pan and tilt assembly for said optical unit, said pan and tilt assembly being adapted to pivot said optical unit in a controlled manner about at least one of three orthogonal axes; the method further comprising orienting said pan and tilt assembly to coarsely point said optical unit toward said detection zone and using said status overlay image and said pan and tilt assembly to pivot said optical unit and allow a precise pointing of the optical unit common line of sight toward said detection zone.

12. The method as claimed in claim 11, further comprising identifying permanent markers in said status overlay image and using said identified permanent markers to precisely align said optical unit using said pan and tilt assembly.

13. The method as claimed in claim 1, further comprising providing at least one sensor, each sensor being at least one of a temperature sensor, an inclinometer, a compass, an accelerometer and a global positional system, said method further comprising using information captured by said at least one sensor for at least one of said positioning said field of view, said detecting said signal echo and said determining said location.

14. The method as claimed in claim 1, further comprising providing an angular position sensor for generating information about a current angular position of the optical unit, said method further comprising using said information about said current angular position for said positioning said field of view.

15. The method as claimed in claim 1, further comprising repeating said steps of obtaining, detecting and determining for a number of repetitions; tracking said location of said object in said field of view in each repetition; determining a displacement speed of said object in said field of view using successive ones of said tracked locations for said object.

16. The method as claimed in claim 1, further comprising sending said status overlay image to an external processor.

17. The method as claimed in claim 1, further comprising repeating said providing an image that encompasses the field of view by said image sensing module to obtain a sequence of images, carrying out compression on said sequence of images, generating a compressed video output and sending said compressed video output to an external processor.

18. The method as claimed in claim 1, further comprising applying image processing on said image to detect candidate objects, extracting a position of said candidate objects in said field of view from said image, using said extracted position to guide said determining said location for said object.

19. The method as claimed in claim 1, wherein said positioning the field of view of said receiver module to cover said detection zone using said status overlay image further comprises:
sending said status overlay image to an external processor;
receiving a detection zone location information;
positioning said field of view using said detection zone location information.

20. The method as claimed in claim 19, wherein said detection zone location information includes at least one of an outline for said detection zone, a width of a traffic lane, an installation height for said optical unit, said minimum distance and said maximum distance.

21. The method as claimed in claim 1, wherein said positioning the field of view of said receiver module to cover said detection zone using said status overlay image further comprises:
sending a series of said status overlay image to an external processor;
receiving a validation for a detected object located in said detection zone on at least one of status overlay image of said series;
determining said detection zone location based on said validation;
positioning said field of view using said detection zone location.

22. The method as claimed in claim 1, wherein said positioning the field of view of said receiver module to cover said detection zone using said status overlay image further comprises:
- sending said status overlay image to an external processor;
- storing an aerial view of an area surrounding and including said detection zone;
- receiving data concerning an installation of said optical unit;
- comparing said status overlay image to said aerial view and using said data to determine a detection zone location for said detection zone in said status overlay image;
- positioning said field of view using said detection zone location.

* * * * *